(12) United States Patent
Mustapha et al.

(10) Patent No.: US 12,737,774 B2
(45) Date of Patent: Sep. 15, 2026

(54) FIELD EMISSIONS SYSTEM

(71) Applicant: Schlumberger Technology Corporation, Sugar Land, TX (US)

(72) Inventors: Hussein Mustapha, Abu Dhabi (AE); Samat Ramatullayev, Abu Dhabi (AE); Alaa Maarouf, Abu Dhabi (AE)

(73) Assignee: Schlumberger Technology Corporation, Sugar Land, TX (US)

( * ) Notice: Subject to any disclaimer, the term of this patent is extended or adjusted under 35 U.S.C. 154(b) by 235 days.

(21) Appl. No.: 18/693,864

(22) PCT Filed: Oct. 12, 2022

(86) PCT No.: PCT/US2022/046457
§ 371 (c)(1),
(2) Date: Mar. 20, 2024

(87) PCT Pub. No.: WO2023/064401
PCT Pub. Date: Apr. 20, 2023

(65) Prior Publication Data

US 2024/0386445 A1 Nov. 21, 2024

Related U.S. Application Data

(60) Provisional application No. 63/262,412, filed on Oct. 12, 2021.

(51) Int. Cl.
*G06Q 30/018* (2023.01)
*G06Q 50/02* (2012.01)

(52) U.S. Cl.
CPC .......... *G06Q 30/018* (2013.01); *G06Q 50/02* (2013.01)

(58) Field of Classification Search
CPC ............................ G06Q 30/018; G06Q 50/02
See application file for complete search history.

(56) References Cited

U.S. PATENT DOCUMENTS 7,421,348 B2 * 9/2008 Swanson ................ G05B 17/02 702/62
11,774,355 B1 * 10/2023 Aslam .................... G08B 21/14 340/632
2009/0070047 A1 * 3/2009 Swanson ................ G05B 17/02 702/32

(Continued)

FOREIGN PATENT DOCUMENTS

WO 2017188858 A1 11/2017
WO 2018117890 A1 6/2018

OTHER PUBLICATIONS

Indian Oil and Gas News, "Machine Learning Could Enhance Methane Leak Detection Technology," Nov. 7, 2016.*

(Continued)

*Primary Examiner* — Nathan Erb
(74) *Attorney, Agent, or Firm* — Kyle R. Miiller

(57) ABSTRACT

A method can include receiving input for a field site in a field that emits methane and that includes a plurality of field sites, where a minority class of the field sites emit a majority of the methane; using a trained machine learning model and the input for the field site, making a determination as to whether the field site fits the minority class; and optimizing hydrocarbon production and methane emissions for a field development plan based on the determination.

18 Claims, 11 Drawing Sheets

(56) References Cited

U.S. PATENT DOCUMENTS

| | | | | |
|---|---|---|---|---|
| 2011/0060572 | A1* | 3/2011 | Brown | E21B 43/00 703/10 |
| 2013/0118736 | A1 | 5/2013 | Usadi et al. | |
| 2014/0002639 | A1 | 1/2014 | Cheben et al. | |
| 2017/0300818 | A1* | 10/2017 | Sinitsyn | G06N 5/04 |
| 2018/0266241 | A1 | 9/2018 | Ferguson | |

OTHER PUBLICATIONS

Search Report and Written Opinion of International Patent Application No. PCT/US2022/046457 dated Jan. 18, 2023, 9 pages.

* cited by examiner

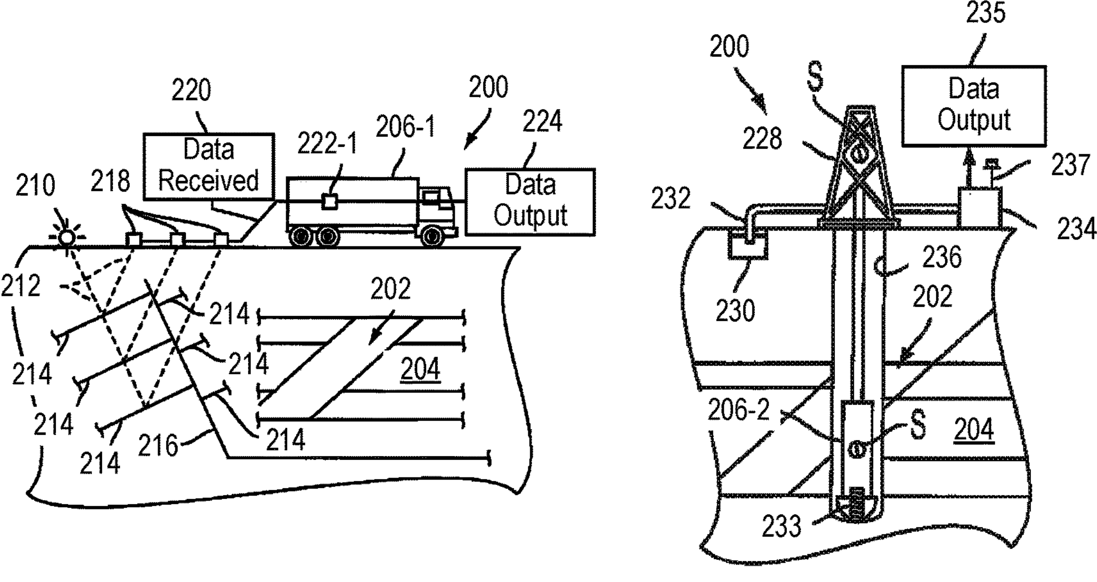
FIG. 2A
FIG. 2B
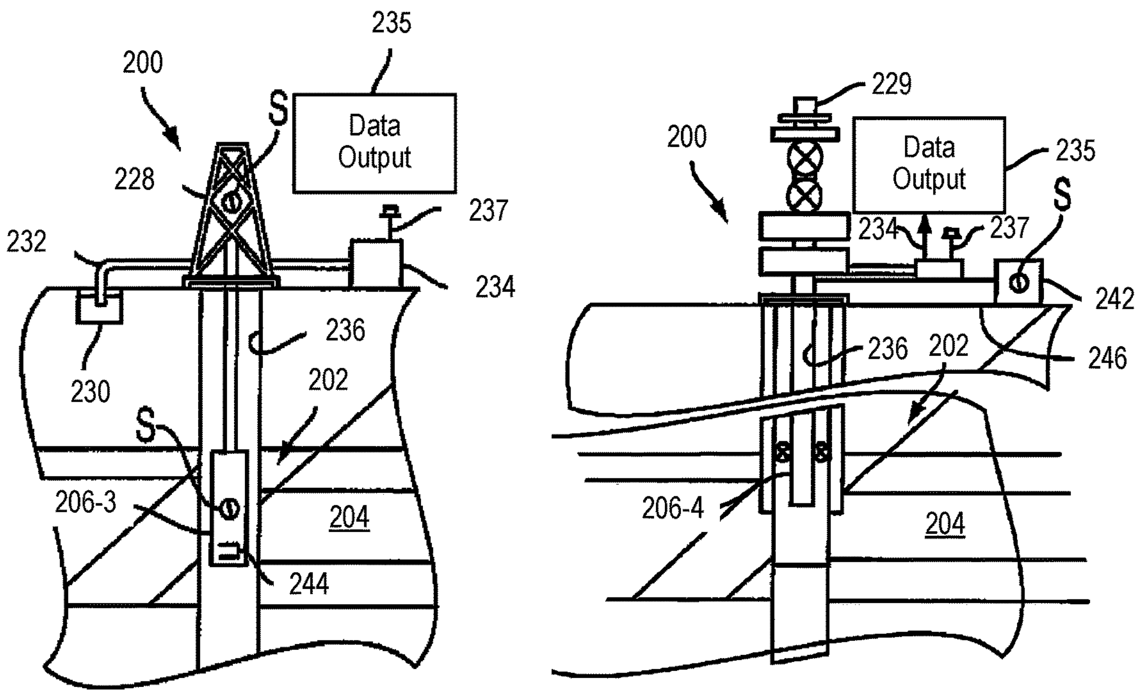
FIG. 2C
FIG. 2D 550
552
554
556
558
560
562
564
566
570
574
576-1
576-2
580
582
584
586
590
592
594
596
598
Water Treatment / Disposal
Multiphase
Gas
Oil
Water

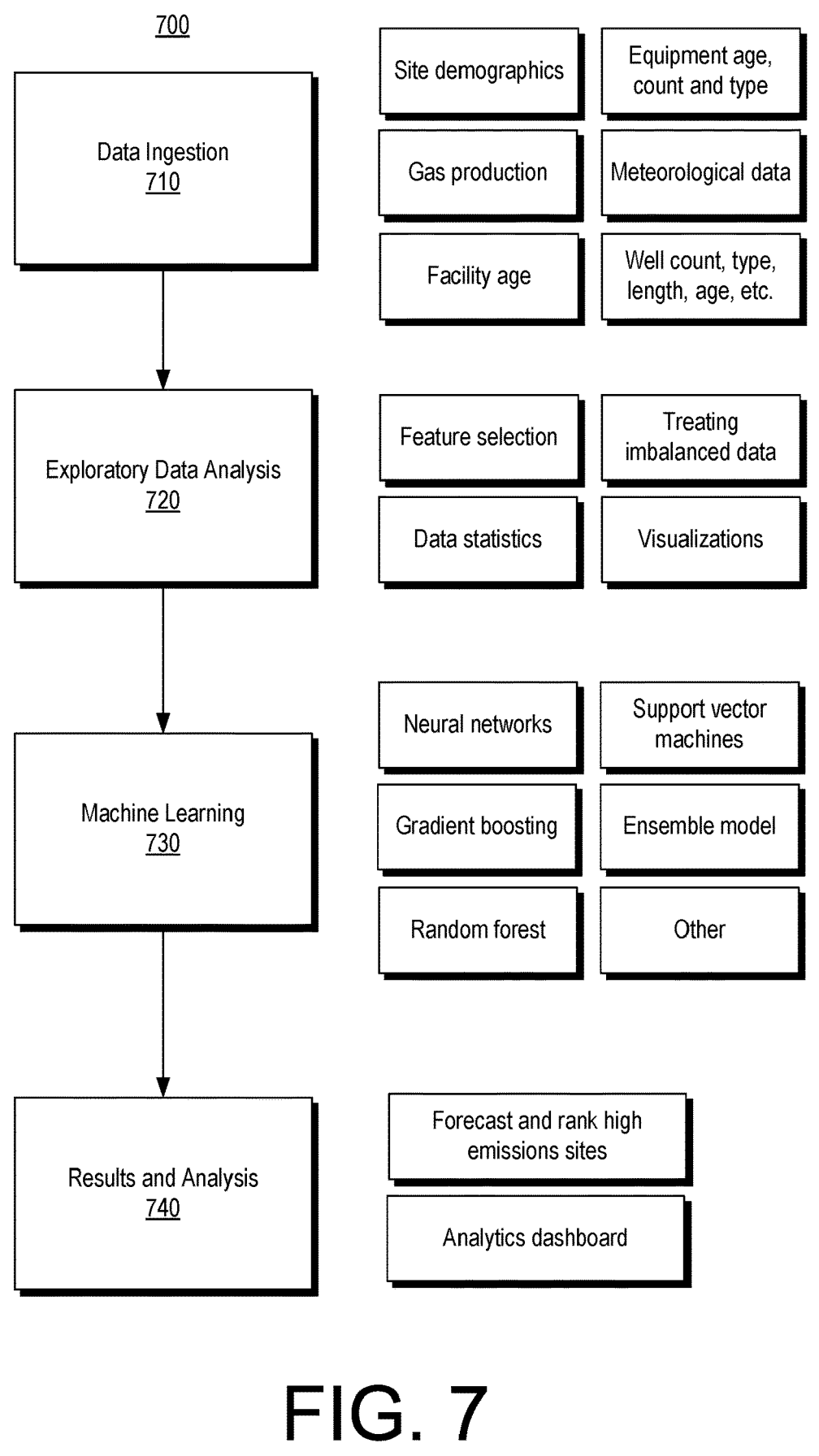

700

Data Ingestion
710

Site demographics

Equipment age, count and type

Gas production

Meteorological data

Facility age

Well count, type, length, age, etc.

Exploratory Data Analysis
720

Feature selection

Treating imbalanced data

Data statistics

Visualizations

Machine Learning
730

Neural networks

Support vector machines

Gradient boosting

Ensemble model

Random forest

Other

Results and Analysis
740

Forecast and rank high emissions sites

Analytics dashboard

FIG. 7

FIELD EMISSIONS SYSTEM

RELATED APPLICATION

This application is a National Stage Entry of International Application No. PCT/US2022/046457, filed 12 Oct. 2022, which claims priority to and the benefit of a U.S. Provisional Application having Ser. No. 63/262,412, filed 12 Oct. 2021, which is incorporated by reference herein in its entirety.

BACKGROUND

A reservoir can be a subsurface formation that can be characterized at least in part by its porosity and fluid permeability. As an example, a reservoir may be part of a basin such as a sedimentary basin. A basin can be a depression (e.g., caused by plate tectonic activity, subsidence, etc.) in which sediments accumulate. As an example, where hydrocarbon source rocks occur in combination with appropriate depth and duration of burial, a petroleum system may develop within a basin, which may form a reservoir that includes hydrocarbon fluids (e.g., oil, gas, etc.). Various operations may be performed in the field to access such hydrocarbon fluids and/or produce such hydrocarbon fluids. For example, consider equipment operations where equipment may be controlled to perform one or more operations. In such an example, control may be based at least in part on characteristics of rock where drilling into such rock forms a borehole that can be completed to form a well to produce from a reservoir and/or to inject fluid into a reservoir. While hydrocarbon fluid reservoirs are mentioned as an example, a reservoir that includes water and brine may be assessed, for example, for one or more purposes such as, for example, carbon storage (e.g., sequestration), water production or storage, geothermal production or storage, metallic extraction from brine, etc.

A process known as field development planning can be performed for one or more types of fields that can include one or more types of reservoirs. Operations associated with reservoirs, which can include exploration, construction, production, injection, etc., can be associated with emissions, which can include greenhouse gas (GHG) emissions. However, field development planning tends to focus on goals such as, for example, production of valuable hydrocarbons from a hydrocarbon reservoir rather than on costly emissions. Given an ever increasing awareness of emissions, and their associated costs, field development plans developed to optimize production of valuable resources alone may actually be, overall, suboptimal. For example, taking oil and gas fields as an example, approximately 57 percent of overall emissions are attributed to methane (CH4 or $CH_4$); noting that methane is a categorized as a GHG as it has approximately 25 times more global warming potential than carbon dioxide (CO2) over a 100-year time frame. Hence, field development planners that lack an ability to assess field emissions cannot generate a field development plan that, today, can be considered optimal because such emissions do have substantial costs.

SUMMARY

A method can include receiving input for a field site in a field that emits methane and that includes a plurality of field sites, where a minority class of the field sites emit a majority of the methane; using a trained machine learning model and the input for the field site, making a determination as to whether the field site fits the minority class; and optimizing hydrocarbon production and methane emissions for a field development plan based on the determination.

A system can include one or more processors; a memory accessible to at least one of the one or more processors; processor-executable instructions stored in the memory and executable to instruct the system to: receive input for a field site in a field that emits methane and that includes a plurality of field sites, where a minority class of the field sites emit a majority of the methane; make a determination as to whether the field site fits the minority class through use of a trained machine learning model and the input for the field site; and optimize hydrocarbon production and methane emissions for a field development plan based on the determination.

One or more non-transitory computer-readable storage media can include processor-executable instructions to instruct a computing system to: receive input for a field site in a field that emits methane and that includes a plurality of field sites, where a minority class of the field sites emit a majority of the methane; make a determination as to whether the field site fits the minority class through use of a trained machine learning model and the input for the field site; and optimize hydrocarbon production and methane emissions for a field development plan based on the determination.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

FIG. 2A, FIG. 2B, FIG. 2C and FIG. 2D illustrate examples of systems and techniques;

FIG. 7 illustrates an example of a method;

DETAILED DESCRIPTION

This description is not to be taken in a limiting sense, but rather is made merely for the purpose of describing the general principles of the implementations. The scope of the described implementations should be ascertained with reference to the issued claims.

Figure 1:
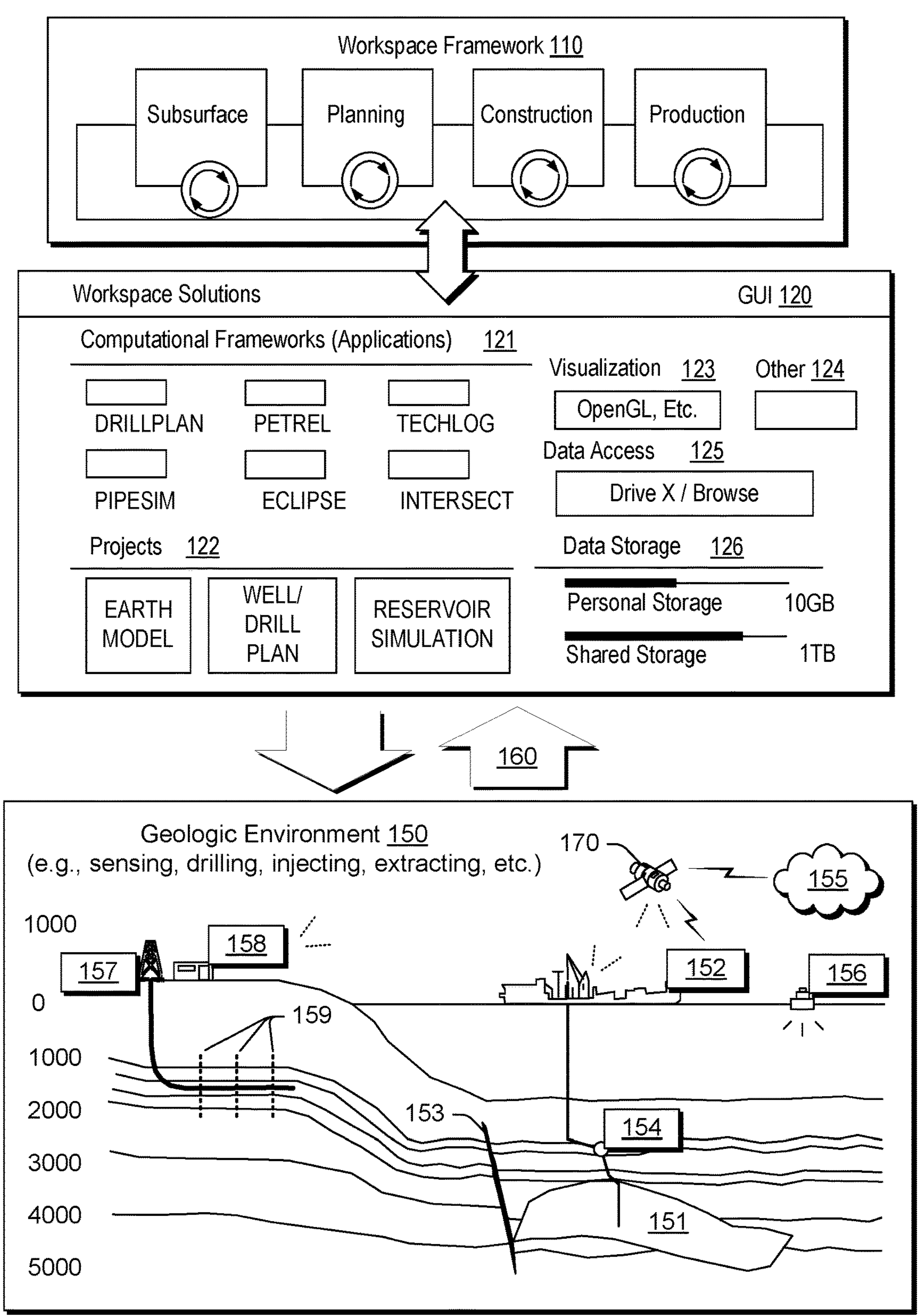
FIG. 1 illustrates an example system that includes various framework components associated with one or more geologic environments.

FIG. 1 shows an example of a system 100 that includes a workspace framework 110 that can provide for instantiation of, rendering of, interactions with, etc., a graphical user interface (GUI) 120. In the example of FIG. 1, the GUI 120 can include graphical controls for computational frameworks (e.g., applications) 121, projects 122, visualization 123, one or more other features 124, data access 125, and data storage 126.

In the example of FIG. 1, the workspace framework 110 may be tailored to a particular geologic environment such as an example geologic environment 150. For example, the geologic environment 150 may include layers (e.g., stratification) that include a reservoir 151 and that may be intersected by a fault 153. A geologic environment 150 may be outfitted with a variety of sensors, detectors, actuators, etc. In such an environment, various types of equipment such as, for example, equipment 152 may include communication circuitry to receive and to transmit information, optionally with respect to one or more networks 155. Such information may include information associated with downhole equipment 154, which may be equipment to acquire information, to assist with resource recovery, etc. Other equipment 156 may be located remote from a wellsite and include sensing, detecting, emitting, or other circuitry. Such equipment may include storage and communication circuitry to store and to communicate data, instructions, etc. One or more satellites may be provided for purposes of communications, data acquisition, etc. For example, FIG. 1 shows a satellite 170 in communication with the network 155 that may be configured for communications, noting that the satellite may additionally or alternatively include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc., may exist where an assessment of such variations may assist with planning, operations, etc., to develop a laterally extensive reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

In the example of FIG. 1, the GUI 120 shows some examples of computational frameworks, including the DRILLPLAN, PETREL, TECHLOG, PIPESIM, ECLIPSE, and INTERSECT frameworks (Schlumberger Limited, Houston, Texas).

The DRILLPLAN framework provides for digital well construction planning and includes features for automation of repetitive tasks and validation workflows, enabling improved quality drilling programs (e.g., digital drilling plans, etc.) to be produced quickly with assured coherency.

The PETREL framework can be part of the DELFI cognitive exploration and production (E&P) environment (Schlumberger Limited, Houston, Texas, referred to as the DELFI environment) for utilization in geosciences and geoengineering, for example, to analyze subsurface data from exploration to production of fluid from a reservoir.

One or more types of frameworks may be implemented within or in a manner operatively coupled to the DELFI environment, which is a secure, cognitive, cloud-based collaborative environment that integrates data and workflows with digital technologies, such as artificial intelligence (AI) and machine learning (ML). Such an environment can provide for operations that involve one or more frameworks. The DELFI environment may be referred to as the DELFI framework, which may be a framework of frameworks. The DELFI environment can include various other frameworks, which may operate using one or more types of models (e.g., simulation models, etc.).

The TECHLOG framework can handle and process field and laboratory data for a variety of geologic environments (e.g., deepwater exploration, shale, etc.). The TECHLOG framework can structure wellbore data for analyses, planning, etc.

The PIPESIM simulator includes solvers that may provide simulation results such as, for example, multiphase flow results (e.g., from a reservoir to a wellhead and beyond, etc.), flowline and surface facility performance, etc. The PIPESIM simulator may be integrated, for example, with the AVOCET production operations framework (Schlumberger Limited, Houston Texas). The PIPESIM simulator may be an optimizer that can optimize one or more operational scenarios at least in part via simulation of physical phenomena.

The ECLIPSE framework provides a reservoir simulator with numerical solvers for prediction of dynamic behavior for various types of reservoirs and development schemes.

The INTERSECT framework provides a high-resolution reservoir simulator for simulation of geological features and quantification of uncertainties, for example, by creating production scenarios and, with the integration of precise models of the surface facilities and field operations, the INTERSECT framework can produce results, which may be continuously updated by real-time data exchanges (e.g., from one or more types of data acquisition equipment in the field that can acquire data during one or more types of field operations, etc.). The INTERSECT framework can provide completion configurations for complex wells where such configurations can be built in the field, can provide detailed chemical-enhanced-oil-recovery (EOR) formulations where such formulations can be implemented in the field, can analyze application of steam injection and other thermal EOR techniques for implementation in the field, advanced production controls in terms of reservoir coupling and flexible field management, and flexibility to script customized solutions for improved modeling and field management control. The INTERSECT framework, as with the other example frameworks, may be utilized as part of the DELFI environment, for example, for rapid simulation of multiple concurrent cases.

The aforementioned DELFI environment provides various features for workflows as to subsurface analysis, planning, construction and production, for example, as illustrated in the workspace framework 110. As shown in FIG. 1, outputs from the workspace framework 110 can be utilized for directing, controlling, etc., one or more processes in the geologic environment 150, and feedback 160 can be received via one or more interfaces in one or more forms (e.g., acquired data as to operational conditions, equipment conditions, environment conditions, etc.).

In the example of FIG. 1, the visualization features 123 may be implemented via the workspace framework 110, for example, to perform tasks as associated with one or more of subsurface regions, planning operations, constructing wells and/or surface fluid networks, and producing from a reservoir.

Visualization features may provide for visualization of various earth models, properties, etc., in one or more dimensions. As an example, visualization features may include one or more control features for control of equipment, which can include, for example, field equipment that can perform one or more field operations. A workflow may utilize one or more frameworks to generate information that can be utilized to control one or more types of field equipment (e.g., drilling equipment, wireline equipment, fracturing equipment, etc.).

As to a reservoir model that may be suitable for utilization by a simulator, consider acquisition of seismic data as acquired via reflection seismology, which finds use in geophysics, for example, to estimate properties of subsurface formations. Seismic data may be processed and interpreted, for example, to understand better composition, fluid content, extent and geometry of subsurface rocks. Such interpretation results can be utilized to plan, simulate, perform, etc., one or more operations for production of fluid from a reservoir (e.g., reservoir rock, etc.). Field acquisition equipment may be utilized to acquire seismic data, which may be in the form of traces where a trace can include values organized with respect to time and/or depth (e.g., consider 1D, 2D, 3D or 4D seismic data).

A model may be a simulated version of a geologic environment where a simulator may include features for simulating physical phenomena in a geologic environment based at least in part on a model or models. A simulator, such as a reservoir simulator, can simulate fluid flow in a geologic environment based at least in part on a model that can be generated via a framework that receives seismic data. A simulator can be a computerized system (e.g., a computing system) that can execute instructions using one or more processors to solve a system of equations that describe physical phenomena subject to various constraints. While several simulators are illustrated in the example of FIG. 1, one or more other simulators may be utilized, additionally or alternatively.

FIG. 2A, FIG. 2B, FIG. 2C, and FIG. 2D illustrate approximate schematic views of a geologic environment 200 that includes a subterranean formation 202 that includes a reservoir 204. FIG. 2A shows an example of a survey operation being performed by a survey tool, such as seismic truck 206-1 that can measure properties of the subterranean formation 202. Such a survey operation can be a seismic survey operation for producing sound vibrations.

In the example of FIG. 2A, a sound vibration 212 is illustrated as being generated by a source 210 where energy reflects off horizons 214 in a portion of the geologic environment 200, particularly a formation 216. As shown, a set of sound vibrations can be received by sensors 218 (e.g., geophones). Data received 220 can be provided as input data to a computer 222-1 of the seismic truck 206-1, and responsive to the input data, the computer 222-1 can generates seismic data output 224. Such seismic data output may be stored, transmitted or further processed as desired, for example, by data reduction.

In the example of FIG. 2B, a drilling operation is shown as being performed by drilling tools 206-2 suspended by rig 228 and advanced into a subterranean formation 202 to form a wellbore 236. As shown, a mud pit 230 can be used to draw drilling mud into the drilling tools 206-2 via a flow line 232 for circulating drilling mud down through the drilling tools 206-2, then up the wellbore 236 and back to the surface. The drilling mud can be filtered and returned to the mud pit. A circulating system may be used for storing, controlling, or filtering the flowing drilling mud. The drilling tools 206-2 can be advanced into the subterranean formation 202 to reach a reservoir 204. As an example, individual wells may target one or more reservoirs. The drilling tools 206-2 can be adapted for measuring downhole properties using logging while drilling (LWD) tools. As an example, one or more logging while drilling (LWD) tools may include features for taking a core sample 233.

In the example of FIG. 2B, computer facilities may be positioned at various locations about the geologic environment 200 (see, e.g., a surface unit 234) and/or at one or more remote locations. In the example of FIG. 2B, the surface unit 234 may be used to communicate with one or more of the drilling tools 206-2 and/or offsite operations, as well as with other surface or downhole sensors. Surface unit 234 can include features for communicating with one or more of the drilling tools 206-2 to send commands thereto and/or to receive data therefrom. The surface unit 234 may collect data generated during the drilling operation and produce data output 235, which may then be stored or transmitted.

In the example of FIG. 2B, sensors (S), such as gauges, may be positioned about the geologic environment 200 to collect data relating to various oilfield operations as described previously. As shown, one or more sensors (S) are positioned in one or more locations in the drilling tools 206-2 and/or at the rig 228 to measure drilling parameters, such as weight on bit, torque on bit, pressures, temperatures, flow rates, compositions, rotary speed, and/or other parameters of the field operation. Sensors (S) may be positioned in one or more locations in the circulating system.

As an example, the drilling tools 206-2 may include a bottom hole assembly (BHA), for example, near a drill bit (e.g., within several drill collar lengths from a drill bit). A bottom hole assembly (BHA) can include capabilities for measuring, processing, and storing information, as well as communicating with the surface unit 234. A BHA can include drill collars for performing various other measurement functions.

As an example, a BHA may include a communication subassembly that communicates with the surface unit 234. For example, consider a communication subassembly that can send signals to and receive signals from the surface using a communications channel such as mud pulse telemetry, electro-magnetic telemetry, or wired drill pipe communications. Such a communication subassembly may include, for example, a transmitter that generates a signal, such as an acoustic or electromagnetic signal, which is representative of the measured drilling parameters.

As an example, a wellbore can be drilled according to a drilling plan that is established prior to drilling. A drilling plan can set forth equipment, pressures, trajectories and/or other parameters that define the drilling process for the wellsite. As an example, a drilling operation may be performed according to a drilling plan; noting that, as information is gathered, the drilling operation may deviate from the drilling plan. As an example, as drilling or other operations are performed, the subsurface conditions may change. For example, an earth model may be adjusted as new information is collected.

The data gathered by one or more sensors (S) may be collected by the surface unit 234 and/or other data collection sources for analysis or other processing. As an example, data collected by sensors (S) may be used alone or in combination with other data. As an example, data may be collected in one or more databases and/or transmitted on or offsite. As an example, data may be historical data, real time data, or combinations thereof. As an example, real time data may be used in real time, or stored for later use. As an example, data may be combined with historical data or other inputs for further analysis. As an example, data may be stored in separate databases, or combined into a single database.

In the example of FIG. 2B, the surface unit 234 may include a transceiver 237 that provides for communications between the surface unit 234 and various portions of the geologic environment 200 and/or one or more other locations. The surface unit 234 may include features to connect to one or more controllers, for example, to actuate mechanisms of equipment at the geologic environment 200. As an example, the surface unit 234 may transmit command signals to one or more pieces of equipment in response to data received. As an example, the surface unit 234 may receive commands via the transceiver 237 or, for example, it may execute commands to a controller.

As an example, one or more processors can be included locally and/or remotely as part of computing equipment that includes memory accessible by at least one of the one or more processors. Such memory can be, for example, one or more computer-readable storage media that can store processor-executable instructions. In such an example, a computer-readable storage medium can be a physical storage device that is non-transitory and not a carrier wave or a signal. As an example, computing equipment can include one or more interfaces that can receive and/or transmit information. As an example, information can include one or more control signals, for example, to control one or more pieces of equipment.

In the example of FIG. 2B, operations may be selectively adjusted based at least in part on data collected. As an example, computing equipment may be utilized to control one or more field operations such as, for example, controlling drilling, weight on bit, pump rates, and/or one or more other operational parameters. As an example, one or more adjustments may be made automatically based on computer protocol, and/or manually by an operator.

In the example of FIG. 2C, a wireline operation being performed by a wireline tool 206-3 being suspended by a rig 228 in a wellbore 236. As shown, the wireline tool 206-3 can be adapted for deployment into the wellbore 236 for generating well logs, performing downhole tests and/or collecting samples. As an example, the wireline tool 206-3 may include equipment for performing at least a portion of a seismic survey operation. As an example, a wireline tool may, for example, include an explosive, radioactive, electrical, and/or acoustic energy source 244 that can send signals to surrounding a subterranean formation 202 and fluids therein.

As an example, the wireline tool 206-3 may be operatively connected to, for example, geophones 218 and the computer 222-1 of the seismic truck 206-1 of FIG. 2A. As an example, the wireline tool 206-3 may provide data to the surface unit 234. As an example, the surface unit 234 may collect data generated during the wireline operation and may produce data output 235 that may be stored and/or transmitted. As an example, the wireline tool 206-3 may be positioned at various depths in the wellbore 236 to provide a survey and/or other information relating to the subterranean formation 202.

As an example, one or more sensors (S), such as gauges, may be positioned to collect data relating to various field operations. As shown in FIG. 2C, a sensor (S) can be positioned in the wireline tool 206-3 to measure downhole parameters which relate to, for example, one or more of porosity, permeability, fluid composition and/or other parameters of the field operation. As an example, temperature, pressure, and one or more other types of parameters may be measured using one or more wireline tools.

In the example of FIG. 2D, a production operation being performed by production tool 206-4 deployed from a production unit or Christmas tree 229 and into a completed wellbore 236 for drawing fluid from one or more downhole reservoirs into surface facilities 242. The fluid can flow from a reservoir 204 through perforations in the casing and into the production tool 206-4 in the wellbore 236 and to surface facilities 242 via a gathering network 246.

As an example, one or more sensors (S), such as gauges, may be positioned to collect data relating to various field operations. As shown, a sensor (S) may be positioned in the production tool 206-4 or associated equipment such as, for example, the Christmas tree 229, the gathering network 246, the surface facility 242, and/or the production facility, for example, to measure fluid parameters such as, for example, fluid composition, flow rates, pressures, temperatures, and/or one or more other parameters of the production operation.

As an example, production operation can include use of one or more injection wells. As an example, one or more gathering facilities may be operatively connected to one or more wellsites for selectively collecting downhole fluids from the wellsite(s).

As an example, various tools may be used in connection with non-oilfield operations, such as gas fields, mines, aquifers, storage or other subterranean facilities. As an example, various measurement tools capable of sensing parameters, such as seismic two-way travel time, density, resistivity, production rate, etc., of the subterranean formation and/or its geological formations may be used. As an example, various sensors (S) may be located at various positions along a wellbore to collect data and/or monitor one or more conditions. As an example, one or more sources of data may be provided from one or more offsite locations.

Figure 3:
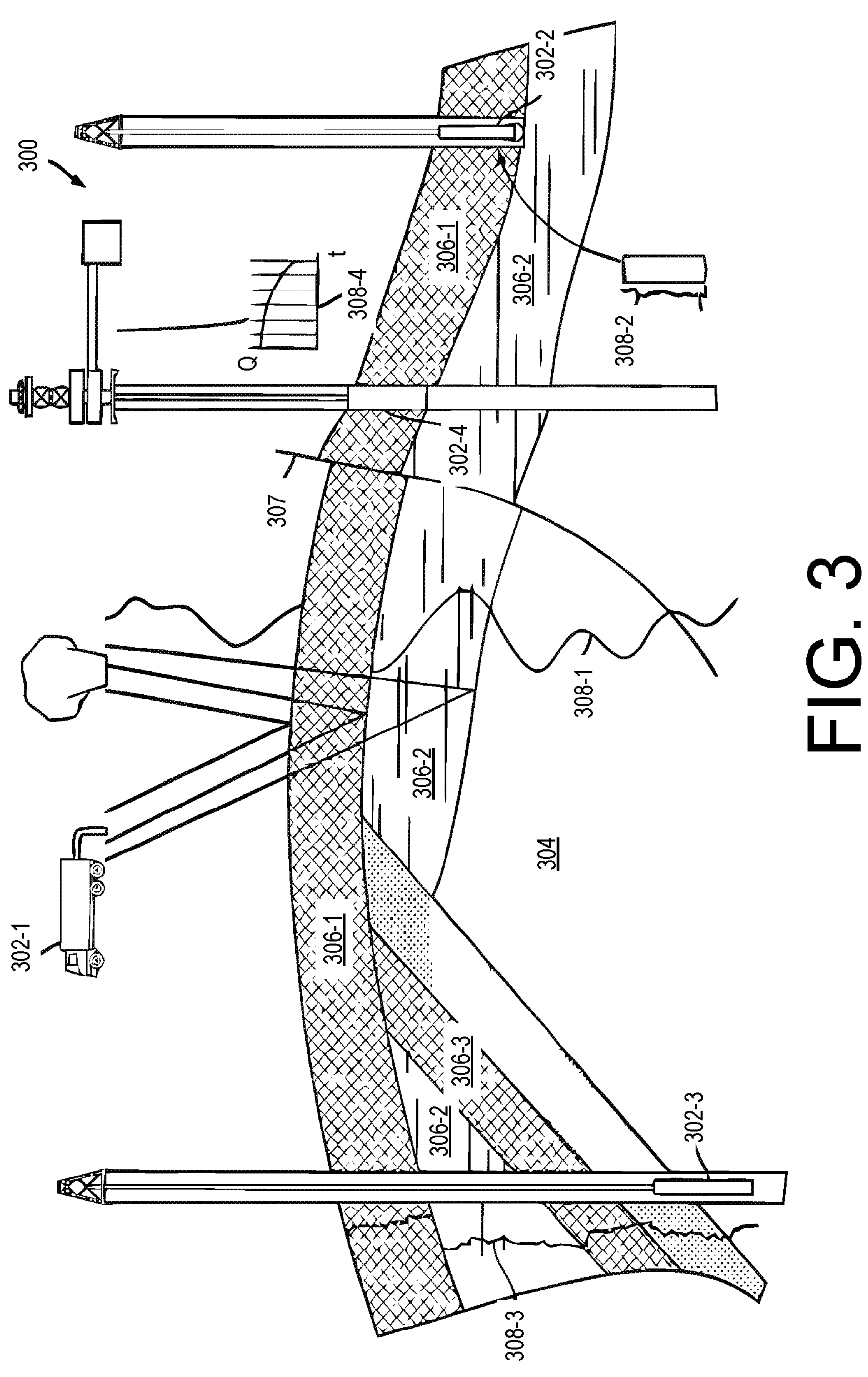
FIG. 3 illustrates examples of systems and techniques.

FIG. 3 shows an example of a schematic view, partially in cross section of a geologic environment 300 where data acquisition tools 302-1, 302-2, 302-3 and 302-4 are positioned for collecting data of a subterranean formation 304. As an example, the data acquisition tools 302-1, 302-2, 302-3 and 302-4 can correspond to tools such as those of FIGS. 2A to 2D (e.g., 206-1, 206-2, 206-3 and 206-4). As an example, one or more data acquisition tools can acquire data (e.g., plots, measurements, etc.).

In the example of FIG. 3, various examples of data plots 308-1, 308-2 and 308-3 are shown, which may be data plots (e.g., data measurements, etc.) generated by corresponding data acquisition tools 302-1, 302-2 and 302-3, respectively. Such information may be analyzed to aid in defining one or more properties, etc.

In the example of FIG. 3, the data plot 308-1 can be a seismic two-way response over a period of time; the data plot 308-2 can be core sample data measured from a core sample of a formation (e.g., used to provide data, such as a graph of the density, porosity, permeability, or some other physical property of the core sample over the length of the core). As an example, one or more tests for density and/or viscosity may be performed on fluids in a core at varying pressures and/or temperatures. As an example, the data plot 308-3 can be a log (e.g., logging trace, plot, etc.) that provides a resistivity or other measurement of a formation at various depths and/or with respect to time.

In the example of FIG. 3, a production decline curve or graph 308-4 can be a data plot of fluid flow rate over time. As an example, a production decline curve can provide production rate at various times. For example, as fluid flows through a wellbore, measurements can be taken for fluid properties such as, for example, one or more of flow rate, pressures, composition, etc.

As an example, the subterranean structure 304 of FIG. 3 can include a plurality of geological formations 306-1,

306-2, 306-3 and 306-4. As an example, consider one or more of the following types of layers, a shale layer 306-1, a carbonate layer 306-2, a shale layer 306-3 and a sand layer 306-4. As an example, a fault 307 can extend through the shale layer 306-1 and the carbonate layer 306-2.

In the example of FIG. 3, seismic data displayed in the data plot 308-1 from the data acquisition tool 302-1 can be used by a geophysicist to determine characteristics of the subterranean formations and features; core data shown in data plot 308-2 and/or log data from a well log of the data plot 308-3 may be used by a geologist to determine various characteristics of the subterranean formation; and/or production data from the plot 308-4 can be used by the reservoir engineer to determine fluid flow reservoir characteristics. As an example, data analyzed by a geologist, a geophysicist and a reservoir engineer may be analyzed using one or more modeling techniques where output therefrom may be utilized in planning and/or performing one or more field operations.

Figure 4:
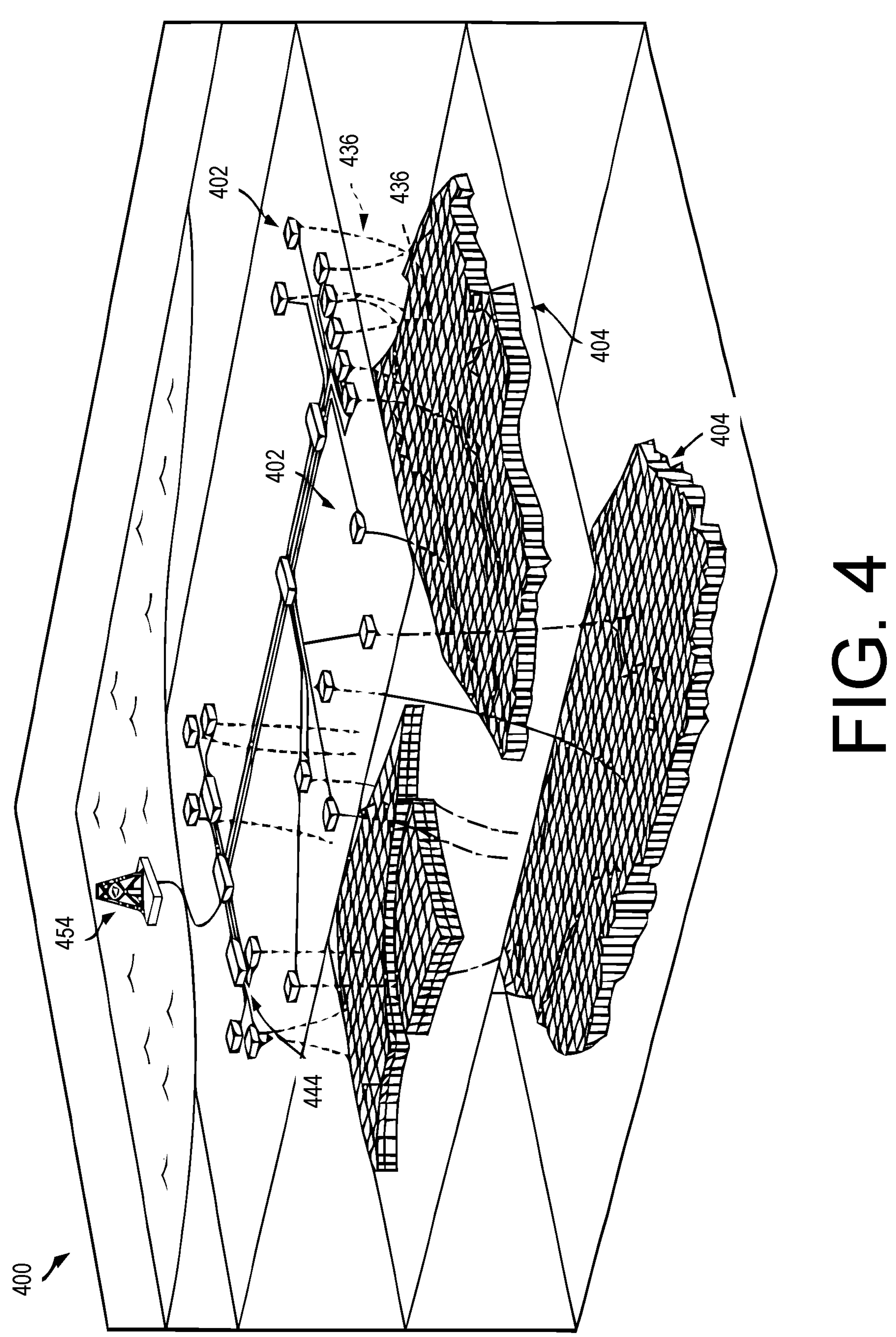
FIG. 4 illustrates an example of equipment at one or more field sites.

FIG. 4 shows an example of a geologic environment 400. As shown, the geologic environment 400 includes a plurality of wellsites 402 operatively connected to a processing facility 454. In the example of FIG. 4, individual wellsites 402 can include equipment that can form individual wellbores 436. Such wellbores can extend through subterranean formations 406 including one or more reservoirs 404. Such reservoirs 404 can include fluids, such as hydrocarbons. As an example, wellsites can draw fluid from one or more reservoirs and pass them to one or more processing facilities via one or more surface networks 444. As an example, a surface network can include tubing and control mechanisms for controlling flow of fluids from a wellsite to a processing facility.

Figure 5:
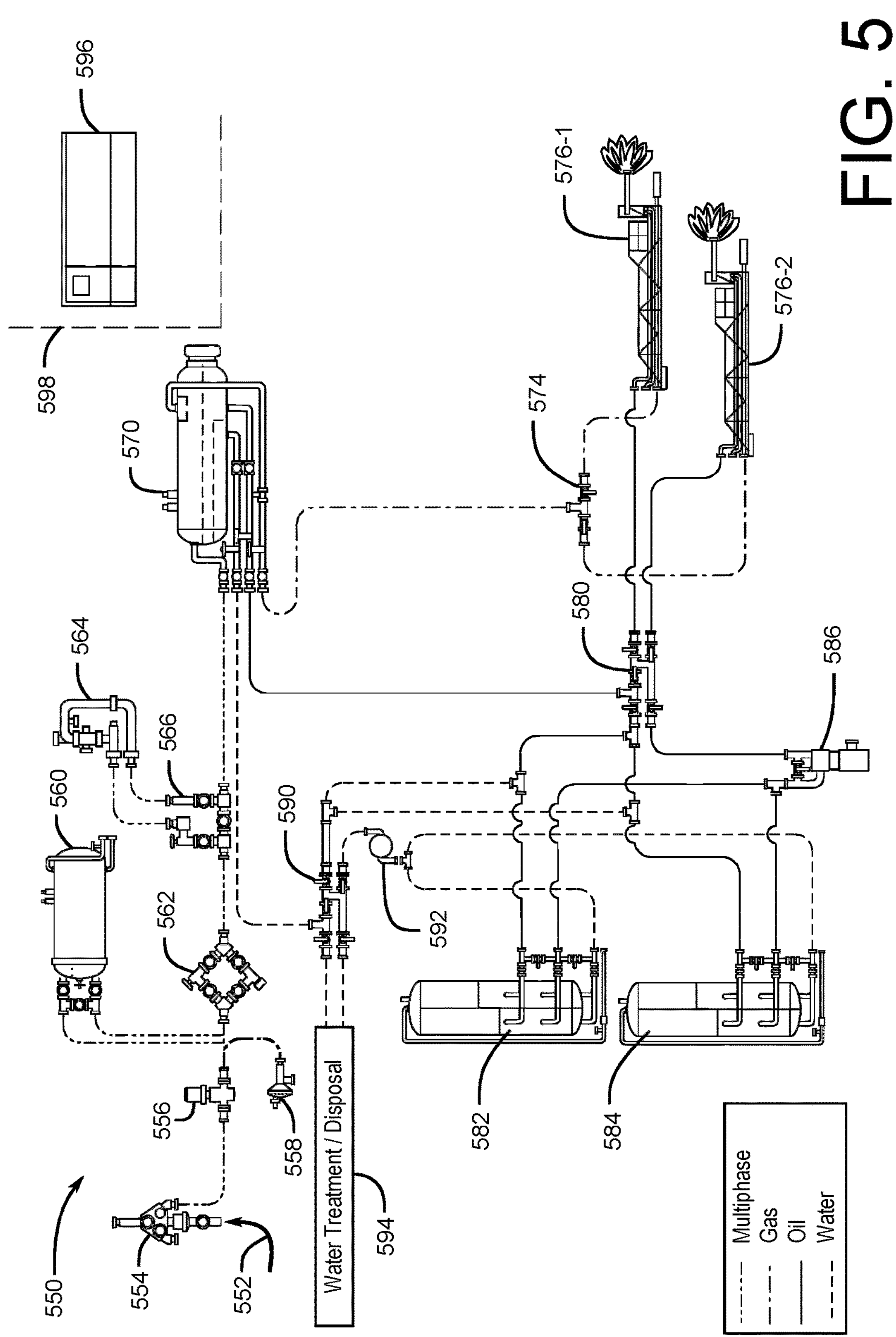
FIG. 5 illustrates an example of a system.

FIG. 5 shows an example of a system 550, which may be referred to as a surface well testing system. The system 550 can include various features of the system 100 of FIG. 1.

In FIG. 5, a multiphase fluid (represented by an arrow 552) enters a flowhead 554 and is routed to a separator 570 through a surface safety valve 556, a steam-heat exchanger 560, a choke manifold 562, a flow meter 564, and an additional manifold 566. In the example of FIG. 5, the system 550 includes a chemical injection pump 558 for injecting chemicals into the multiphase fluid flowing toward the separator 570, as may be desired.

In the example of FIG. 5, the separator 570 can be a three-phase separator that separates the multiphase fluid 552 into gas, oil, and water components. The separated gas can be routed downstream from the separator 570 through a gas manifold 574 to either of the burners 576-1 and 576-2 for flaring gas and burning oil. The gas manifold 574 includes valves that can be actuated to control flow of gas from the gas manifold 574 to one or the other of the burners 576-1 and 576-2. Although shown next to one another in FIG. 5, the burners 576-1 and 576-2 may be positioned apart from one another, such as on opposite sides of a rig, etc.

As shown in the example of FIG. 5, the separated oil from the separator 570 can be routed downstream to an oil manifold 580. Valves of the oil manifold 580 can be operated to permit flow of the oil to either of the burners 576-1 and 576-2 or either of the tanks 582 and 584. The tanks 582 and 584 can be of a suitable form such as, for example, vertical surge tanks including fluid compartments. Such an approach allows each of the tanks 582 and 584 to simultaneously hold different fluids, such as water in one compartment and oil in the other compartment. An oil transfer pump 586 may be operated to pump oil through the well testing system 550 downstream of the separator 570. The separated water from the separator 570 can be similarly routed to a water manifold 590. The water manifold 590 includes valves that can be opened or closed to permit water to flow to either of the tanks 582 and 584 or to a water treatment and disposal apparatus 594. A water transfer pump 592 may be used to pump the water.

In the example of FIG. 5, a cabin 596 at a wellsite may include various types of equipment to acquire data from the well testing system 550. These acquired data may be used to monitor and control the well testing system 550. In at least some instances, the cabin 596 can be set apart from the well test area having the well testing system 550 in a non-hazardous area. In the example of FIG. 5, a dashed line 598 indicates a demarcation between the hazardous area having the well testing system 550 and the non-hazardous area of the cabin 596.

The equipment of a well testing system can be monitored during a well testing process to verify proper operation and facilitate control of the process. Such monitoring can include taking numerous measurements by appropriate sensors during a well test, examples of which can include choke manifold temperature and pressures (upstream and downstream), heat exchanger temperature and pressure, separator temperature and pressures (static and differential), oil flow rate and volume from the separator, water flow rate and volume from the separator, and fluid levels in tanks of a system.

As an example, a system can be configured for local and/or remote rendering of information, control, etc. For example, consider a mobile computing device such as a tablet computing device that can be operatively coupled to remote computing resources via a wired network, a wireless network, etc. In such an example, the remote computing resources may be or include a one or more cloud management platform. In such an example, a mobile computing device can include hardware suitable to execute a browser application or another type of application suitable for rendering graphical user interfaces to a display, which may be a touchscreen display.

As explained with respect to various examples in FIG. 1 to FIG. 5, operations can be performed at one or more sites. Associated with such operations, emissions may occur. For example, consider CO2 emissions, methane emissions and/or one or more other types of emissions.

As mentioned, in oil and gas fields, approximately 57 percent of overall emissions are attributed to methane (CH4 or $CH_4$). As such, efforts are being made to reduce methane emissions in the oil and gas industry. Methane is a categorized as a greenhouse gas as it has approximately 25 times more global warming potential than carbon dioxide (CO2) over a 100-year time frame. To reduce and/or mitigate methane emissions, one focus is on methane leakage in the oil and gas sector. However, challenges exist that hinder effective methane emissions reductions. For example, the random and time-depended nature of methane emissions across different locations, where a small number of sites contribute a large portion of emissions, poses a challenge in that uncertainties exist in knowing which sites are or may become high emitters. Such uncertainties pose issues in making site-based emissions predictions. One approach to site assessment can include sensor-based monitoring. However, installation of hundreds of sensors such as optical gas imaging technology at different locations to cover a large number of sites is costly, time-consuming, and/or impractical. Further, such a sensor-based approach for existing sites may not directly help with planning for potential emissions from new sites and/or from expansion of facilities, operations, etc., at one or more of the existing sites.

As an example, a field emissions system can leverage sensor data from existing sites, whether operational, decommissioned, etc., to improve planning, operations, etc., whether for new sites and/or one or more of the existing sites, in a manner that accounts for emissions and, particularly, a reduction in overall emissions.

A sensor-based approach generally focuses on identifying sources of methane emissions at a site and then quantifying the methane emissions by deploying sensors at the site. Such an approach tends to be implemented on a site-by-site basis such as, for example, a well-by-well basis. For example, consider the burners 576-1 and 576-2 of FIG. 5, which may be at a site to service a single well. In such an example, a sensor-based approach may deploy an imaging device or imaging devices to capture flare images for one or both of the burners 576-1 and 576-2. Flare images may indicate whether a flare exists or not and, for example, may help to characterize quality of combustion of methane. While such information can be helpful, by itself, it does not provide sufficient insight into why a site may be a high methane emitter. Hence, such a sensor-based approach may not provide information that can meaningfully help to optimize field development planning for new sites and/or modifications at existing sites.

As explained, without an ability to account for field emissions, field development planning can result in a sub-optimal plan. As an example, a field emissions system can include and/or be operatively coupled to a field development planner (FDP). Such a system can provide for green field development planning and may be, or be part of, a green FDP (GFDP). Green field development planning can aim to provide specifications for development at one or more field sites in a manner whereby the risk of developing a high emitting site is reduced. Such an approach to planning can help to assure that an optimal field development plan is green in that it takes into account emissions, particularly GHG emissions (e.g., at least methane emissions). When field emissions are taken into account, a result can be optimal with respect to multiple objectives, where at least one of those objectives relates to emissions. As explained, in the oil and gas industry, GHG emissions are an issue where an objective may be to limit or otherwise reduce GHG emissions, while another objective may be to meet a production target. A GFDP can operate to generate a field development plan that accounts for both emissions and production objectives.

As an example, a FDP and/or a GFDP can include one or more features of the FDPlan framework (Schlumberger Limited, Houston, Texas), which may be implemented in a cloud platform or other manner. The FDPlan framework includes features for coordinating multi-disciplinary teams involved in field development planning in a shared, live planning environment. Such an approach can help to reduce isolated decision-making and can help make a field development planning workflow more collaborative and agile where domains and experts can operate in a more coherent manner. The FDPlan framework provides a shared planning environment for access to technical and economic data. The FDPlan framework can leverage the DELFI environment (e.g., one or more DELFI hosted frameworks, etc.) and can provide for data discovery and benchmarking workflows to produce data insights and knowledge to drive informed decision making with high confidence in decision quality. As an example, the FDPlan framework can be operatively coupled with one or more simulators (e.g., ECLIPSE, INTERSECT, PIPESIM, etc.) to generate simulation results that can be indicative of hydrocarbon production, hydrocarbon processing, emissions generation, etc. As an example, the FDPlan framework may utilize one or more application programming interfaces (APIs) for access to features for data, simulation, etc. The FDPlan framework can generate an agile and coherent development plan through evaluation of numerous cross-domain scenarios. The FDPlan framework can enable a project team to assess a broad range of scenarios with reduced risk and select those that deliver better return on investment (ROI). With integration of a field emissions system (e.g., a field emissions framework), the FDPlan framework can account for methane and/or one or more other types of emissions. Such an approach can provide for a green-based ROI. As an example, a GFDP can generate field development plans for scenarios that can account for emissions. For example, consider an emissions-based scenario that aims to reduce emissions of an existing field through field site adjustments and/or introduction of new field sites with lower predicted emissions levels. In such an example, hydrocarbon production targets may be preserved or, for example, improved (e.g., over a selected period of time).

As an example, a FDP or GFDP may utilize an optimization engine that can be a multi-objective optimization engine. For example, consider multiple objectives that include hydrocarbon production and methane emissions. In such an example, a solution may be determined via dominance where, for example, a dominance test may be applied. As an example, one or more types of Pareto concepts may be utilized and/or may arise for a multi-objective optimization problem. For example, as to a Pareto optimal solution, a non-dominated solution set can, given a set of solutions, be a set of the solutions that are not dominated by a member of the solution set. As an example, a non-dominated set of an entire feasible decision space may be called the Pareto optimal set. As an example, a boundary defined by the set of points mapped from a Pareto optimal set may be called the Pareto optimal front. As an example, a multi-objective optimization engine may aim to find a set of solutions that is as close as possible to a Pareto optimal front and, for example, to find a set of solutions that are as diverse as possible.

As an example, a multi-objective optimization engine may utilize a weighted sum approach that can scalarize a set of objectives into a single objective where weight of an objective may be chose in proportion to a relative metric of the objective. As another example, consider an e-constraint approach that can involve restricting objectives. As yet another example, consider a weighted metric approach that can combine multiple objectives using a weighted distance metric. As an example, one or more evolutionary (e.g., genetic algorithm (GA)) approaches may be utilized, which may operate on a set of candidate solutions. As an example, one or more cluster-based approaches may be utilized (e.g., a strength Pareto evolutional algorithm (SPEA) approach).

As an example, green field development planning may apply the Pareto principle, which holds that a certain minority of causes account for a majority of outcomes. For example, in various fields, a few sites can account for a majority of methane emissions. Hence, in a direct approach, by understanding why those few sites are high methane emitters, a field emissions system can be utilized for field development planning to reduce risk of creating new sites and/or modifying existing sites that are likely to be or become high methane emitters.

As an example, green field development planning may apply the Pareto principle in an indirect manner, which can include anomaly detection. For example, a model may be acceptably good at predicting low or low to medium methane emissions sites based on inputs for those sites. In such an example, where the model fails, the corresponding input may be considered an anomaly. In such an example, the anomaly may be flagged as a possible high emissions site or, for example, at least a methane emissions site that may output emissions above a low level (e.g., or other acceptable level). As explained, under the Pareto principle, a minority of sites (e.g., a minority class) may be the cause of a majority of the emissions where, in terms of model training for machine learning (ML) models, data can exist for a majority of the sites where those sites are not high emissions sites. Thus, a data imbalance may exist in that more data exists for non-high emissions sites than for high emissions sites. A workflow can include using one or more ML model techniques and/or one or more other techniques for identifying anomalies, which may be considered to be outliers.

As an example, a field emissions system may aim to understand why some sites are low methane emitters and why some sites are high methane emitters. However, as explained, a field emissions system may suitably operate by considering high methane emitters to be anomalies and/or outliers, for example, according to a Pareto principle approach. As an example, a field emissions system may operate in one or more manners to generate results that can provide for an overall reduction in methane emissions.

As explained, a field emissions system may utilize one or more models. For example, consider use of one or more machine learning models that can be trained to predict high emissions sites, which may be via direct prediction and/or via anomaly detection. In such an example, the predicted high emissions sites, which may include one or more existing sites and/or one or more new sites, may be prioritized with respect to field development planning. For example, as to an existing site, one or more field actions may be taken to reduce a high level of emissions and/or to mitigate a risk of a future high level of emissions. As to a prospective new site, a FDP may operate as a GFDP to replan the prospective new site in a manner that aims to assure that it will not be a high emissions site. For example, consider utilization of a field emissions system that can be utilized to check sites based on one or more site related inputs. In such an example, specifications for a site that may have been predicted to be a high emissions site (e.g., directly and/or indirectly) may be revised and retested to see if that site will still be predicted to be a high emissions site. As an example, a field emissions system can operate in combination with a FDP, which may be in an iterative manner to assure that a field development plan is greener in that the risk of high emissions sites is reduced.

As mentioned, a field emissions system may provide for some amount of understanding of low emissions sites. In such an example, where a model predicts that a site may be a high emissions site (e.g., directly and/or indirectly), the field emissions system may automatically present information as to specifications for one or more low emissions sites, which may be considered by a user of a FDP to adjust specifications for a predicted high emissions site to bring that flagged site into emissions compliance (e.g., consider an emissions target, etc.).

As an example, a field emissions system may operate in an automated manner with a FDP to make an automated effort to bring a flagged site into emissions compliance. For example, consider a system that can identify a likely parameter or group of parameters that may be a cause of the high emissions prediction for the flagged site where information from one or more low emitting sites can be utilized to automatically adjust the likely parameter or group of parameters. In such an example, if the flagged site cannot be remedied through in an automated manner, the flagged site may be highlighted for manual consideration.

As explained, one or more ML models may be utilized to make predictions as to emissions for a site, particularly high emissions, which may be via direct prediction or indirect prediction through anomaly detection. As explained, high emissions sites may be minority sites (e.g., fit a minority class) where such minority site may be difficult to ascertain by a human while being relatively easier to ascertain by one or more trained ML models. Thus, a field emissions system can reduce demand for human resources, optionally operating in an automated manner to flag high emissions sites, whether potential for high emissions at a site is likely immediate and/or likely for a future time. As explained, as a majority of sites are not high emissions sites, there can be a high likelihood that a high emissions site, as a minority site, can be brought into compliance. And, if not, such a minority site may be shut down to thereby reduce overall emissions for a field.

As explained, a GFDP can include and/or be operatively coupled to a field emissions system. As an example, a GFDP can be operated in a manner that helps to produce high net present value (NPV) projects where NPV directly or indirectly accounts for emissions. As an example, a GFDP may operate to generate emissions statistics for prospective projects where such statistics may help to identify one or more high emissions projects that can then be modified in an effort to reduce overall emissions for a field development plan. As explained, one or more ML models may be utilized to predict whether a site (e.g., a project) will be a high emissions site or not. As an example, such an approach may include generating emissions estimates for sites, which may be probabilistic, quantitative, etc.

As an example, in view of a Pareto principle approach, a GFDP may utilize statistics to prove or disprove a Pareto principle. For example, past experience for field sites of a field may indicate that a certain, minority percentage of the field sites (e.g., 20 percent) account for a majority of the emissions from the field (e.g., greater than 50 percent). In a first iteration, a GFDP may flag a number of field sites as being classified as high emissions sites (e.g., via direct prediction, via anomaly detection, via outlier detection, etc.). In such an example, the GFDP may determine if the flagged number of field sites is less than some amount such as, for example, 30 percent, and account for more than some amount such as, for example, 50 percent of emissions from the field. If such criteria are not met, the GFDP may assume that the Pareto principle is not in effect for the field and that the flagged field sites may be within some generally acceptable statistical distribution of the sites for the field. However, where such criteria are met, then the GFDP may assume that the Pareto principle is in effect and that considerable reductions in emissions can be achieved by focusing on the flagged field sites. Such an approach can cost-effectively and proactively address methane emissions mitigation in the oil and gas sector from planning to execution.

As an example, a GFDP can provide for predicting emissions health and/or receiving emissions health data across one or more asset(s). For example, such a GFDP may prioritize infill wells based on a site emission health score, with a goal of lowering emissions while maintaining a production target. In such an approach, the GFDP can generate a global optimized FDP with the fewest emitting wells.

Infill drilling can involve the addition of wells in a field that decreases average well spacing. Such an approach may accelerate expected recovery and increase estimated ultimate recovery, for example, in heterogeneous reservoirs (e.g., via improving continuity between injectors and producers, etc.). As well spacing can be decreased via infill drilling, shifting well patterns can alter formation-fluid flow paths and increase sweep to areas where greater hydrocarbon saturations exist. As an example, an infill well may behave similarly to one or more neighboring wells where, if the one or more neighboring wells are not high emitters of methane, the infill well may have a relatively low probability of being a high emitter of methane. As an example, a method can include optimizing hydrocarbon production and methane emissions for a field development plan by considering one or more field sites for one or more infill wells. As an example, infill wells can be additional wells targeting pockets of hydrocarbons that may have been left behind from operations associated with a prior field development plan.

As an example, a GFDP may be applied to an existing field development plan to generate a new field development plan that can be a green field development plan. In such an example, the GFDP may consider one or more approaches to achieving an optimal field development plan that considers hydrocarbon production and methane emissions.

As an example, a GFDP can provide for one or more of predicting and/or ranking methane emissions for a new site or an existing site with increased/reduced scope of operations/activities; ranking existing sites with different activities/operations by methane emissions magnitude; predicting incremental methane emission from existing sites with increased/reduced operations (e.g., production increase/decrease, infill drilling, installation of new valves, compressors, etc.); producing an optimal set of sites to be targeted for expansion of operations (e.g. production increase, infill drilling, waterflooding, gas injection, etc.); and serving as a feed to plan of an asset to produce a most optimal green field development plan.

Figure 6:
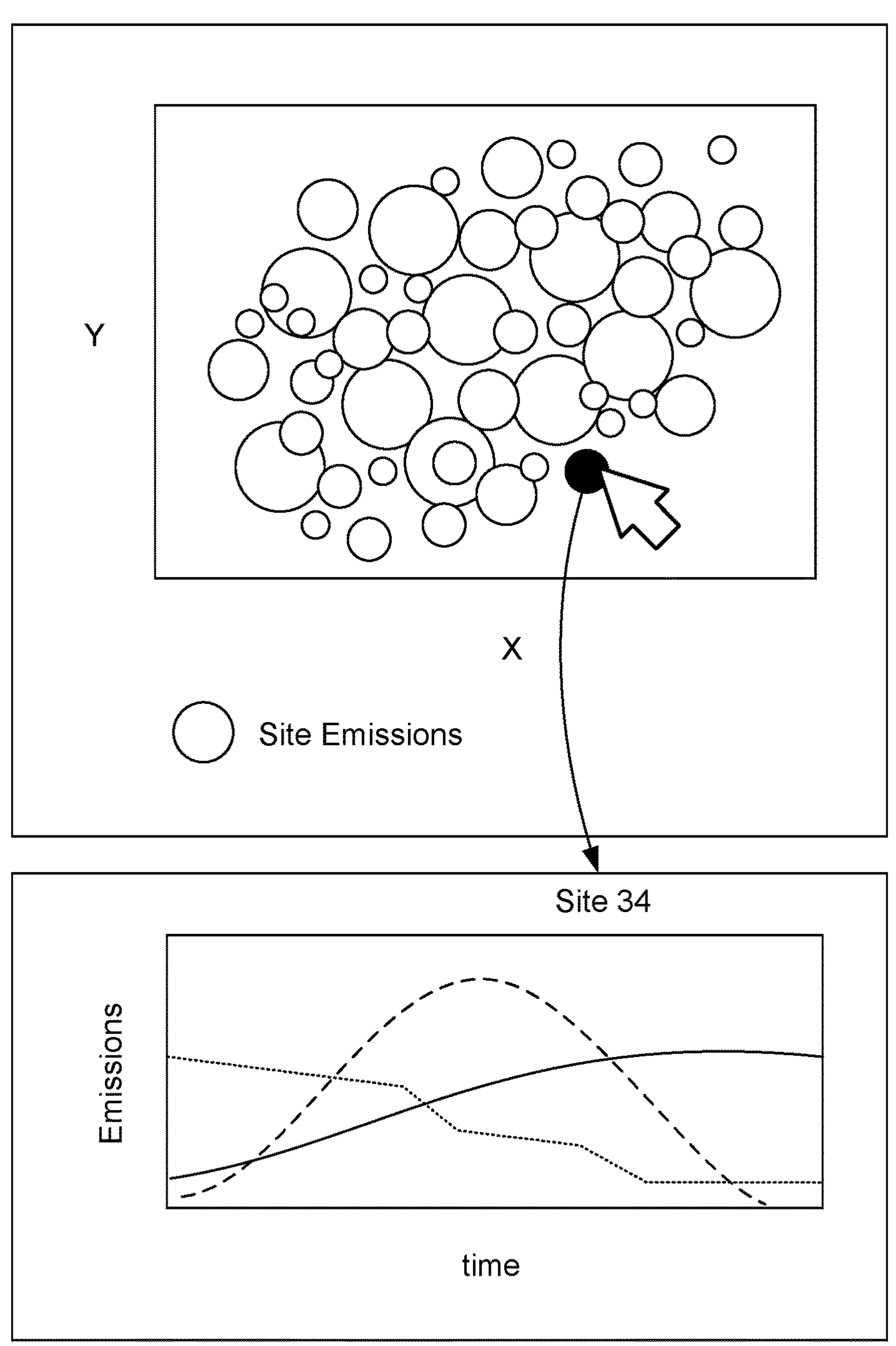
FIG. 6 illustrates an example of a graphical user interface.

FIG. 6 shows an example of a graphical user interface (GUI) 600 that includes a map of a field with a number of field sites where each of the field sites has an associated indicator representative of a site emissions metric, which may be relative to that of the field or specific (e.g., a numeric value). As to a relative approach, consider a distribution where each circle indicates a deviation from an average emissions value, a median emissions value, a compliant emissions value, etc. As to a specific metric, each circle may represent an amount of methane emitted over a period of time (e.g., as a rate or as a total amount). As an example, large circles may indicate anomalies and/or outliers, which may be deemed possible high emissions sites. As shown, the GUI 600 can provide for understanding of field sites and their associated emissions.

As an example, the GUI 600 may be interactive through one or more graphical controls such that, for example, a user may hover or click on a particular field site to cause rendering of a panel with additional information. For example, consider the site labeled as "Site 34" where an emissions with respect to time plot can be rendered in a panel where the plot may indicate various types of emissions with respect to a particular period of time, which may span an initial time (e.g., when a well came online) and an end time, which may represent an end-of-life time, a decommissioning time, etc.

As an example, a field site may be a wellsite with a well where the well is associated with a production decline curve. In such an example, as production declines, one or more technologies, techniques, etc., may be implemented to assist production. For example, consider water flooding, artificial lift, enhanced oil recovery, hydraulic fracturing, chemical treatment, etc. In such an example, emissions associated with such approaches may be taken into account by a field emissions system and hence by a GFDP. As an example, consider artificial lift driven by an electric submersible pump (ESP) where the ESP is powered by electricity generated by an on-site gas turbine generator. In such an example, emissions, including methane leakage, may be taken into account. In some instances, methane combustion by the gas turbine generator may reduce methane leakage (e.g., where methane would otherwise be released without flaring); whereas, in other instances, risk of methane leakage may increase, for example, due to incomplete combustion and/or loss of methane via one or more conduits, valves, etc., associated with operation of the gas turbine generator.

As an example, a field emissions system may operate according to a particular set of inputs for a field site (e.g., specifications) to make predictions as to the field site. As an example, a field emissions system may operate according to sets of inputs for a number of field sites to make predictions for a field or a portion thereof. As an example, a field emissions system may operate according to sets of inputs for a number of field sites to make predictions for more than one field.

As to types of inputs, consider, for example, well count, type of well, age of well, length of well, equipment at well, gas production at well, location, etc. Such types of inputs can be parameters that may be specified during a field development plan workflow. Such parameters can include parameter values that may be considered to be specifications that characterize a site or sites.

As an example, a field emissions system can be part of or operatively coupled to a FDP to form a GFDP where inputs as to field sites (e.g., parameters that characterize field sites) can include one or more of site ID, longitude, latitude, wind speed (e.g., m/s), wind direction, oil production (e.g., stb/d), gas production (e.g., scf/d), facility age (e.g., years), number of well pads, number of manifolds, number of valves, types of valves, number of pipelines, sizes of pipelines, number of compressors, number of flares, number of tanks, equipment age, number of wells, and well age. As an example, inputs may include one or more parameters associated with equipment at one or more field sites as shown in, for example, FIG. 1, FIG. 2A, FIG. 2B, FIG. 2C, FIG. 2D, FIG. 3, FIG. 4, and FIG. 5. As an example, the system 550 of FIG. 5 may be at a field site where the system 550 can be characterized by various inputs.

As mentioned, a FDP generally does not include features for prediction of methane emissions. As a consequence, a sensor-based approach is commonly implemented, however, at a limited number of sites, which may include low emission sites, high emissions sites and sites with emissions between some low level and some high level. As a sensor-based approach can be limited by cost, the number of instrumented sites in a field may not be representative of the sites in the field. Further, it may be difficult to ascertain why emissions differ amongst sites. For example, consider a physics-based approach where an effort is made to explain differences. Such an approach may be inaccurate as the reasons for differences can be many and they may vary over time.

As explained, a field emissions system may utilize one or more techniques that can identify patterns where underlying reasons for differences in patterns may not, at first, be clear. For example, consider a ML model-based approach where data can be utilized to train one or more ML models such that a trained ML model or trained ML models can predict, directly and/or indirectly, whether a field site is a high emitter or not based on a number of inputs. In such an approach, once a number of trained ML models are generated, they may be utilized to understand what parameters and associated values may be indicative of a high emissions site. As an example, an ensemble approach may be utilized where one ML model may more reliably predict one type of high emitter and where another ML model may more reliably predict another type of high emitter.

As explained, a field emissions system can include features to estimate incremental methane emissions from different operations. For example, consider one or more models that can estimate incremental methane emission from one or more of increasing oil production, drilling infill wells, installing new valves, and installing new compressors, etc., at a site. As explained, a field emissions system can be part of or operatively coupled to a FDP to perform, from planning to operations, a green field development plan.

As an example, a field emissions system can include capabilities for acquiring methane emissions data from different sites, which may be performed by accessing one or more databases and/or one or more data streams. Such data can include historical data and current data (e.g., real-time and/or near real-time).

As to building an initial model for a field emissions system, a method can include performing a sufficient number of one-time extensive site visits where, at each site, data are acquired such as by downwind tracer flux sensors to quantify methane emissions and by onsite observations with an infrared camera to identify emission sources. In such an approach, data can be acquired for each site for a moment or a window of time. As an example, such data may be supplemented with existing data (e.g., historical data), augmented data and/or synthetic data. As an example, data may be supplemented with satellite data. As mentioned, data acquired for an initial build of a ML model can be sufficient to generate a trained ML model that can make predictions as to likelihood of a field site being a high emitter, for one or more reasons (e.g., directly and/or indirectly). Such a trained ML model may be tested such that a scope of use can be assigned to the trained ML model. Where such a trained ML model can predict high emitter sites for at least some sets of inputs, it may be utilized by a FDP to address those types of inputs to flag potential high emitter sites. As explained, under a Pareto principle approach, emissions may be greatly reduced upon identifying actual or potential high emissions sites, whether those sites are existing, new, subject to planned expansion, etc., and, for example, whether those sites are currently actual high emissions sites and/or likely to be high emissions sites at one or more times in the future.

As an example, a field emissions system can utilize one or more trained ML models to predict methane emissions for a new site and/or an existing site with increased/reduced scope of operations/activities, optionally without installation of emissions-specific sensors. For example, a decision may be made to install one or more emissions-specific sensors based on one or more criteria. In such an example, where a ML model predicts that a new site is likely to be a very high emitter (e.g., directly and/or indirectly), though with some level of uncertainty in that prediction, to address the uncertainty, one or more emissions-specific sensors may be included in a plan for the new site. As explained, where a new site is flagged as potential high emissions site, a planner may adjust one or more parameters for that site and then have the site reassessed by a trained ML model to see whether or not the prediction remains high for emissions. Such an approach may result in a site remaining high, however, with greater uncertainty as to its high emissions status (e.g., as to a direct prediction and/or as to a prediction that the site is an anomaly). As the uncertainty may be high due to aspects of the trained ML model (e.g., the site being a type of site not consistently suitably assessed by the trained ML model), a decision may be made to proceed with the new site, however, with installation of one or more emissions-specific sensors to acquire data. Such an approach can then provide for acquisition of data for the site where the trained ML model may be re-trained and/or otherwise fine-tuned to improve predictions by the ML model. For example, if the site proves to be a non-high emitter, then data can be utilized to improve the ML model for predicting non-high emitters; whereas, if the site proves to be a high emitter, then the data can be utilized to improve the ML model for making direct predictions or, for example, for making predictions as to anomalies (e.g., such data may be excluded from training, utilized to identify inputs of high emitters, etc.). As explained, the data acquired by a site can be utilized in combination with parameters that characterize the site such that a focused approach can be undertaken to assess the site and to improve the prediction capabilities of a field emissions system and, hence, a FDP such that the FDP is an intelligent GFDP that can improve over time with limited sensor information and, for example, targeted sensor installation.

As explained, one or more trained ML models may be part of or otherwise linked to a FDP such that a GFDP is formed where the GFDP can perform optimizations for field development resources and outcomes, along with optionally improving the GFDP itself. As an example, GFDP can be utilized to estimate emissions a number of development scenarios and to identify an optimal scenario (e.g., or a few Pareto optimal scenarios) in terms of emissions areas to focus on. For example, a GFDP may generate output that includes a highest NPV scenario that accounts for emissions and/or includes a highest NPV scenario while also outputting information for one or more scenarios that have the lowest emissions. As an example, a GFDP may provide options for selecting how to rank scenarios, which may include options as to one or more types of emissions. For example, consider options that include a methane option and a carbon dioxide option, where one or more both may be selected.

As an example, a GFDP can provide for implementation of multiple workflows, which may include comparative workflows to generate comparative results. For example, consider two workflows for detecting and ranking high-emitting sites. In such an example, both workflows may ingest inputs (e.g., site demographics, gas production, facility age, equipment counts, age and types, online meteorological data acquired from different sites, etc.) to rank and/or predict methane emissions. As explained, a direct prediction approach may be utilized along with an indirect prediction approach, which may include anomaly detection, outlier detection, etc. As explained, historical data may indicate that the Pareto principle holds for sites and methane emissions in that, for example, an 80-20 rule may be applied where 80 percent of the methane emissions are caused by 20 percent of the sites.

As explained, data may be acquired by performing one or more site visits where sensors are utilized to perform measurements (e.g., downwind tracer flux to quantify methane emissions, onsite observations with an infrared camera to identify emission sources, etc.).

As mentioned, a GFDP may implement anomaly detection, which may be a class of techniques that includes outlier detection. Anomaly detection can be utilized to detect cases that are in the minority compared to cases that are in the majority. Anomaly detection may provide for rejection of certain cases to aid in statistical analysis, for example, to compute mean, standard deviation, etc. Anomaly detection may be used to remove cases to improve model-based predictions of other cases and/or anomalous cases. As an example, anomaly detection may range from use of linear regression models to deep learning ML models.

As to ML model-based approaches, anomaly detection may be performed using one or more of various types of learning techniques, which can include supervised, semi-supervised and unsupervised anomaly detection techniques.

Supervised techniques utilize a dataset that has been labeled, for example, as normal (e.g., or levels considered normal) and abnormal (e.g., one or more levels consider not normal) and can involve training a classifier and/or a predictor. For example, a classifier may classify input cases as being normal or abnormal or, for example, at one or more levels that can be assessed to identify abnormal cases.

Where a sufficient amount of labeled data is unavailable, particularly as to anomalous cases (e.g., due to rarity of such cases, etc.), one or more other techniques may be utilized. For example, consider using one or more semi-supervised anomaly detection techniques that assume that some portion of available data is labelled. In such an approach, the labeled data can include normal data that can be used in training a ML model that can classify and/or predict normal behavior. In such an approach, classifications and/or predictions may be accompanied by a level of certainty where, if the level of certainty is low, an input case may be considered to be anomalous. For example, consider output from a trained ML model that indicates a low probability of an input case being "normal" while outputs for other input cases indicate high probabilities of the input cases being "normal". In such an example, the low probability may indicate that the trained ML model is not sufficiently trained on that input case, which may infer that it is a minority case (e.g., fits a minority class). In such an example, training of the trained ML model may be improved through feedback such as review by a domain expert that can determine if the input case is an anomalous case (e.g., abnormal) or a normal case. If it is a normal case, then it may be labeled as such to improve the trained ML model via re-training; however, if it is an anomalous case, then the trained ML model has performed suitably for anomaly detection.

As to unsupervised anomaly detection techniques, they may utilize unlabeled data where, for example, a ML model may be trained to represent majority cases rather than minority cases. In such an example, the ML model may be expected to perform better for the majority cases and perform poorly for the minority cases such that poor performance for an input case can mean that the input case is an anomalous case.

As an example, a field emissions system may employ a combination of learning techniques. For example, consider using supervised learning to train one or more ML models for predicting high emissions sites and using unsupervised learning to train one or more ML models for identification of outliers (e.g., outlier detection). In such an example, different types of ML models and learning techniques can be employed to improve assessments as to emissions from field sites, which, in turn, can improve performance of a GFDP.

FIG. 7 shows an example of a method 700 that can include a data ingestion block 710 for ingestion of data (e.g., data pertaining to site demographics; gas production; facility age; equipment age, count, and type; meteorology; well count, type, length, age, etc.; etc.); an analysis block 720 for exploratory data analysis (e.g., feature selection, data statistics, treatment of imbalanced data, visualizations, etc.); a learning block 730 for machine learning (e.g., using neural networks, gradient boosting, random forests, support vector machines, ensemble models, etc.); and a results and analysis block 740 for generating results and analyzing results (e.g., forecasting and ranking high emissions sites, rendering to an analytics dashboard, etc.).

In the example of FIG. 7, the method 700 can provide for generating one or more ML models using supervised learning where a trained ML model or trained ML models can predict high emitters based on input. In such an example, high emitter cases, which may be anomalous cases, can be ranked, for example, to identify the highest emitters of the high emitter cases.

As an example, a method can include implementing a supervised ML approach for predicting methane emission rates and thus providing recommendations of the sites which can benefit from maintenance. Such a method can build a ML model that can automatically forecast emission rates by learning from the input features. In such an example, input data may be ingested, pre-processed, and integrated from various sources to produce a consolidated dataset ready for analysis. Before building an ML model, data may be investigated and patterns detected. For example, consider use of one or more exploratory data analysis (EDA) techniques such as, for example, one or more of selecting relevant features automatically, generating data statistics for analysis, and creating visualizations to highlight patterns and draw insights. As explained, a dataset may be imbalanced in that it includes a lower number of high emitters compared to low and/or medium emitting sites. As an example, one or more techniques may be employed to handle imbalanced data. For example, consider identification of high emissions sites data and augmenting such data using one or more augmentation techniques to thereby artificially increase the amount of high emissions sites data.

As an example, input data types may be heterogeneous, for example, including categorical and/or numerical attributes. In such an example, categorical data may be encoded and one or more transformations applied to create a format compatible for use in training. As an example, data may be split into training data and testing data, where one or more batches of testing data may be set aside for testing purposes for one or more rounds of training. As an example, a dataset may be split into 75 percent for training one or more ML models and 25 percent for testing one or more trained ML models on unseen data (test data).

For purposes of predicting whether an input case is a high emitter case, one or more ML techniques may be used. For example, consider an approach that aims to generate a ML model for predicting methane emission rates from a dataset output from use of EDA where the ML model can be or include one or more of neural networks, gradient boosting, random forests, support vector machines, and ensemble models. A method can include using training data to train one or more ML models where, for example, a best performing model may be saved for future predictions; noting that an ensemble approach may involve using more than one trained ML model for making predictions.

As an example, a method can include defining a cut-off threshold to identify a minimum methane emission rate for considering a site to be high emitting. In such an approach, statistics may be utilized, for example, to identify populations (e.g., multimodal distributions, etc.) that may demarcate sites with different behaviors. As explained, a Pareto principle approach may be implemented using one or more criteria such that a percentage of high emissions sites are selected that produce a certain high percentage of total emissions (e.g., 20 percent of the site producing 80 percent of the emissions). As an example, ML model-based emission predictions may be filtered according to a threshold or another approach to generate a prioritized list of high emitters for repair, maintenance, shut down, etc.

As explained, a method can include producing a ranked list of emitters (e.g., from high to low) to ensure a high effectiveness of ML model-based generated predictions. Such a ranking allows for prioritization of sites to perform repairs, maintenance, etc., to reduce cost per site to reach a certain mitigation target and decrease the mitigation cost.

Figure 8:
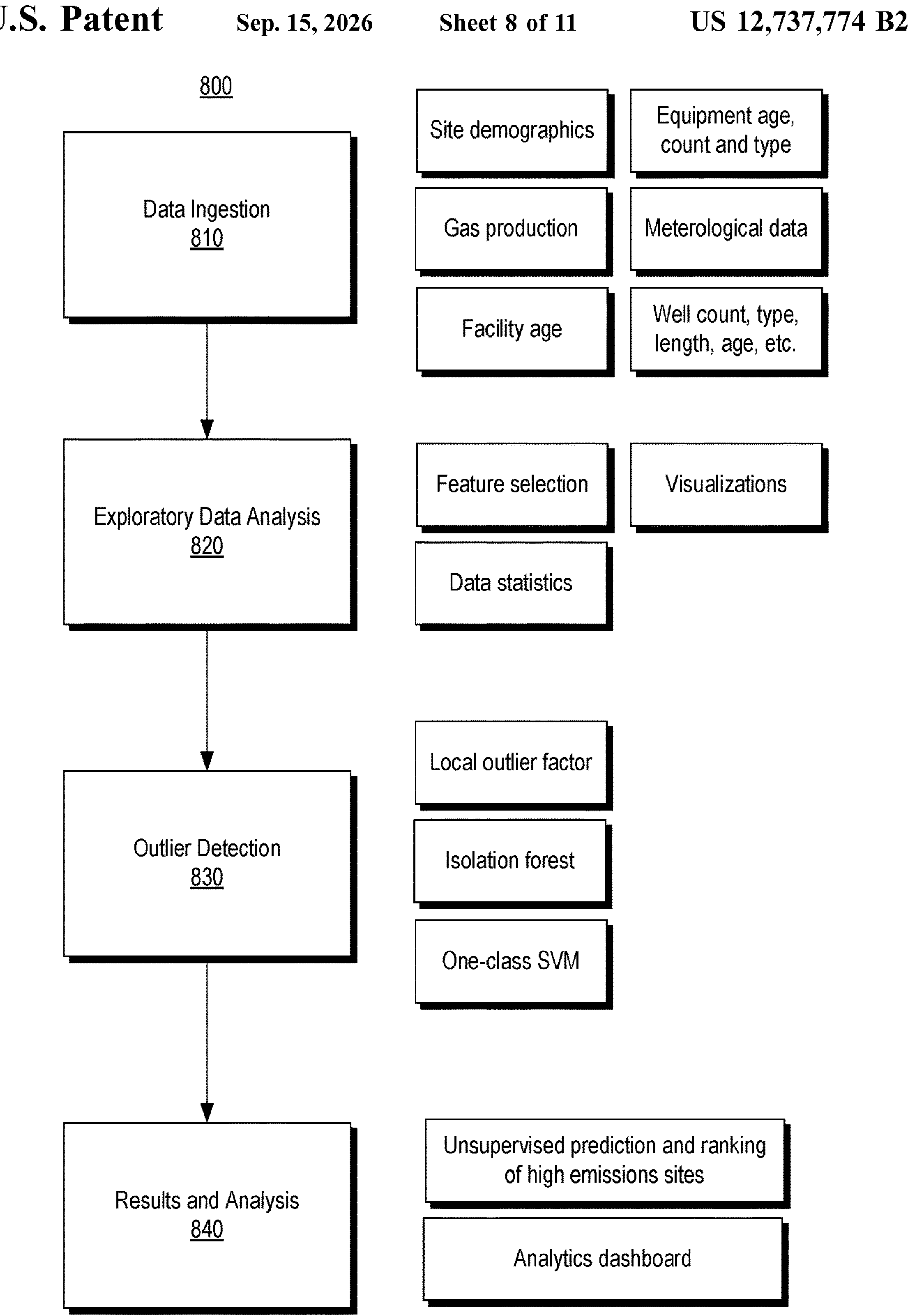
FIG. 8 illustrates an example of a method.

FIG. 8 shows an example of a method 800 that can include a data ingestion block 810 for ingestion of data (e.g., data pertaining to site demographics; gas production; facility age; equipment age, count, and type; meteorology; well count, type, length, age, etc.; etc.); an analysis block 820 for exploratory data analysis (e.g., feature selection, data statistics, visualizations, etc.); an outlier detection block 830 for detection of outliers (e.g., using local outlier factor, isolation forest, one-class support vector machine, etc.); and a results and analysis block 840 for generating results and analyzing results (e.g., unsupervised prediction and ranking of high emissions sites, rendering to an analytics dashboard, etc.).

As explained, the method 700 of FIG. 7 may employ supervised learning while the method 800 of FIG. 8 may employ unsupervised learning. As to an unsupervised ML approach, it can provide for spotting high methane emitting sites. Akin to the supervised ML approach of FIG. 7, the unsupervised ML approach of FIG. 8 can utilize data from various sources that can be ingested and consolidated followed by use of EDA techniques.

As explained, high emitting sites can constitute the minority population among the data such that they may be treated like outliers (e.g., a minority class) such that outlier detection can be employed (e.g., anomaly detection). In the example of FIG. 8, the method 800 can provide for identifying sites having one or more types of irregular patterns compared to one or more types of patterns of a majority population of sites. As indicated with respect to the outlier detection block 830, one or more of various outlier detection techniques may be employed for identifying high emitting sites. For example, consider one or more of local outlier factor, isolation forest, and one-class SVM. As an example, the method 800 can utilize multiple techniques and, after tuning parameters for these techniques, select a top performing technique for future predictions; noting that multiple techniques may be selected for future predictions according to an ensemble approach. As an example, the method 800 may be utilized to flag and/or tag high emissions sites.

As to local outlier factor, it is a technique that is based on a concept of a local density, where locality is given by k nearest neighbors, whose distance is used to estimate the density. In such an approach, by comparing the local density of an object to the local densities of its neighbors, regions of similar density can be identified and points that have a substantially lower density than their neighbors can be identified, where the latter can be considered to be outliers. Local density can be estimated by a typical distance at which a point can be reached from its neighbors. The definition of reachability distance used in local outlier factor is an additional measure to produce more stable results within clusters.

As to an isolation forest, it is a technique that can be applied for anomaly detection through use of isolation (e.g., how far a data point is to the rest of the data), rather than modeling normal points. An isolation forest can explicitly isolates anomalies using binary trees, which can provide for rapid anomaly detection that directly targets anomalies without profiling the population of normal instances. An isolation forest technique can have a linear time complexity with a low constant and a low memory requirement, which tends to be suitable for high volume data. An isolation forest technique can split a data space using lines that are orthogonal to an origin, and assign higher anomaly scores to data points that demand few splits to be isolated. Anomalies in a large dataset may follow very complicated patterns that are difficult to detect visually in the majority of cases, which is one reason ML techniques can be applied for outlier detection.

As to one-class SVM, it is a one-class type of technique, which may be referred to as one-class classification (OCC) or unary classification or class-modeling. OCC tries to identify objects of a specific class amongst a number of objects, by primarily learning from a training set of the objects of that class, although there exist variants of one-class classifiers where counter-examples are used to further refine the classification boundary. OCC is different from and more difficult than a traditional classification problem, which tries to distinguish between two or more classes with the training set containing objects from the classes. An OCC approach can focus on removing a small number of outliers or anomalies. As to one-class SVM, it is a technique that can rely on identifying the smallest hypersphere (e.g., with radius r, and center c) consisting of the data points in a dataset. A one-class SVM approach may be referred to as a support vector data description (SVDD) technique. A basic SVM paradigm may be trained using two classes (e.g., normal and abnormal); however, a one-class SVM can be trained using one class of examples rather than two classes.

Upon changes in site demographics and/or one or more other input features, a field emissions system may forecast updated emission status, for example, to notify a user, an FDP, etc., which may include a notification with one or more recommended action items.

As explained, results may be rendered to one or more GUIs for purposes of review, interactions, etc. As an example, a GUI may include features for assessment of statistics and gaining insights about a dataset, ML model-based results, and/or actionable recommendations.

Figure 9:
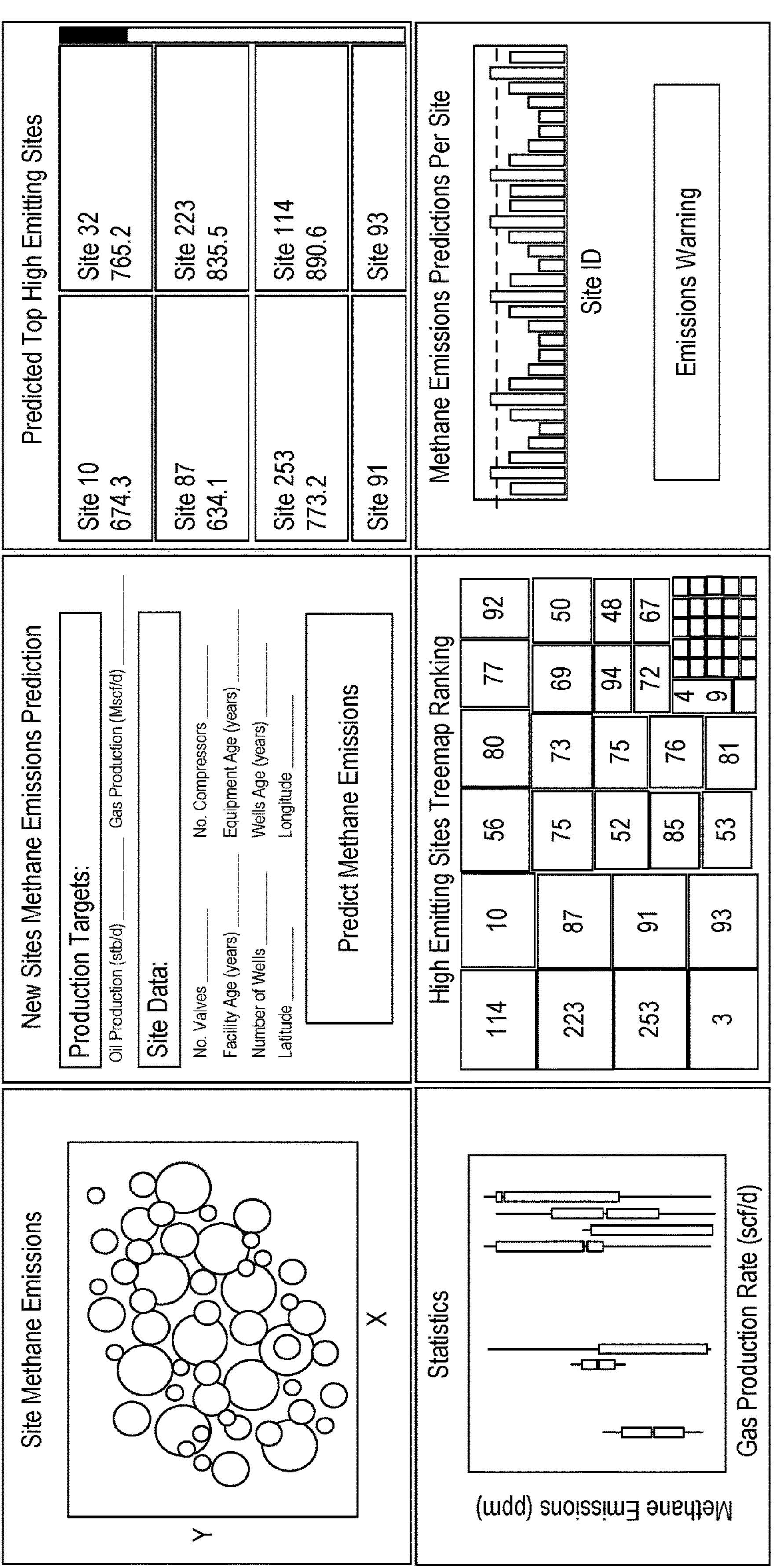
FIG. 9 illustrates an example of a graphical user interface.

FIG. 9 shows an example of a GUI 900 that includes various panels, such as, for example, a site emissions magnitude panel, a methane emissions prediction for new sites panel, a top high emitting sited predicted panel, a data statistics panel, a ranking of high emitting sites panel, and a methane emissions prediction per site panel. The GUI 900 can be interactive, for example, consider entry of information in the panel for prediction for one or more new sites and then actuating a graphical control to execute a prediction method, which may utilize one or more trained ML models. The GUI 900 can be dynamic in that information rendered can be updated based on live streamed data, which may include field data and/or data from one or more FDPs. For example, a team-based approach may be used for field development planning where individual team members can share information, which may be rendered using a GUI such as the GUI 900. In such an approach, as development progresses, team members can be aware of emissions and ranking of sites, optionally along with real-time emissions data for sites, which may include estimated values, measured values, etc. As shown in the GUI 900, an emissions warning graphic may be utilized to notify one or more users of emissions associated with a site where, for example, one or more recommendations may accompany a warning that can be for reducing emissions. As to the dynamic nature of the GUI 900, as high emissions sites are addressed, rankings can change, which may be reflected in real-time in one or more panels of the GUI 900.

As explained, a field emissions system may include one or more ML models that can be linked to a FDP to assess FDP scenarios, which may be based on output from reservoir simulation cases. As an example, a field emissions system may, for each FDP scenario, estimate a corresponding methane emissions amount. Then, the methane emission amount may be integrated to one or more NPV computations as an input to produce a green field development plan.

As an example, one or more ML models may be used to guide generation of an optimal green field development plan. For example, infill wells may be prioritized based on a site's emission health score, with the goal of lowering emissions while maintaining a production target. As a result, a global optimized field development plan with the fewest emitting wells may emerge.

A field emissions system may be implemented to support and guide strategic management decisions for introducing and implementing strategies across different assets to allow for green field development planning. Such an approach can help to reduce methane emissions by identifying high emitter sites to prioritize maintenance and can help to plan and produce the most optimal development scenarios that will result in the lowest emissions while achieving production growth ambitions. As an example, a field emissions system and/or a GFDP can be offered as a system (e.g., a computational framework), a standalone application, software as a service (SaaS), and/or as part of consultancy service.

A field emissions system and/or a GFDP can allow for reduction in time, resources and money spent on identifying high emitter sites for maintenance, etc., and to produce optimal green field development plans for assets. As explained, oil and gas operators spend ever-increasing resources and money on activities related to installation and optimizing location of emission sensors. A field emissions system and/or a GFDP can improve on such practices for planning and producing optimal green field development plans.

Figure 10:
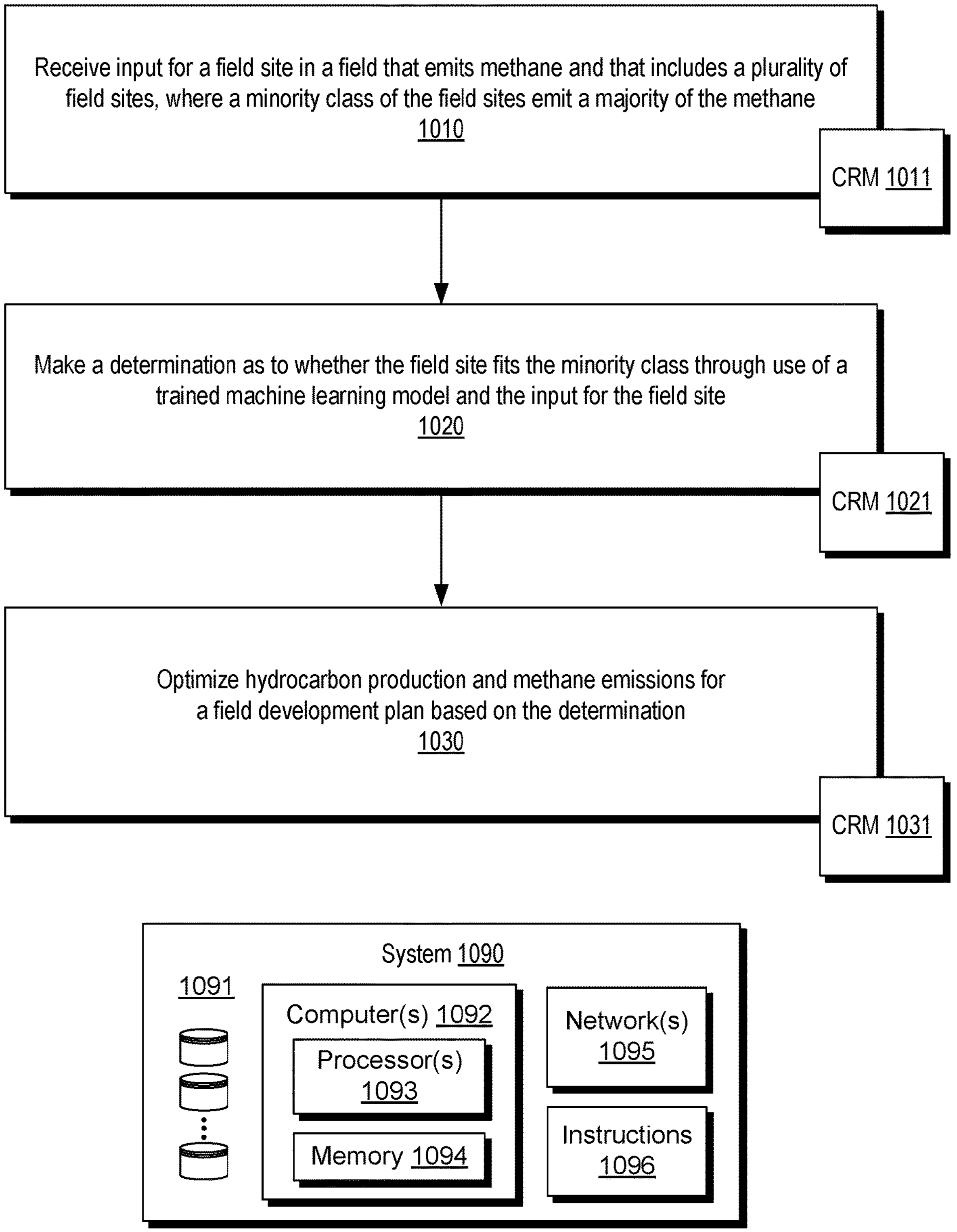
FIG. 10 illustrates an example of a method and an example of a system.

FIG. 10 shows an example of a method 1000 and an example of a system 1090. As shown, the method 1000 can include a reception block 1010 for receiving input for a field site in a field that emits methane and that includes a plurality of field sites, where a minority class of the field sites emit a majority of the methane; a determination block 1020 for, using a trained machine learning model and the input for the field site, making a determination as to whether the field site fits the minority class; and an optimization block 1030 for optimizing hydrocarbon production and methane emissions for a field development plan based on the determination.

The method 1000 is shown in FIG. 10 in association with various computer-readable media (CRM) blocks 1011, 1021, and 1031. Such blocks generally include instructions suitable for execution by one or more processors (or processor cores) to instruct a computing device or system to perform one or more actions. While various blocks are shown, a single medium may be configured with instructions to allow for, at least in part, performance of various actions of the method 1000. As an example, a computer-readable medium (CRM) may be a computer-readable storage medium that is non-transitory and that is not a carrier wave. As an example, one or more of the blocks 1011, 1021, and 1031 may be in the form processor-executable instructions.

In the example of FIG. 10, the system 1090 includes one or more information storage devices 1091, one or more computers 1092, one or more networks 1095 and instructions 1096. As to the one or more computers 1092, each computer may include one or more processors (e.g., or processing cores) 1093 and memory 1094 for storing the instructions 1096, for example, executable by at least one of the one or more processors 1093 (see, e.g., the blocks 1011, 1021, and 1041). As an example, a computer may include one or more network interfaces (e.g., wired or wireless), one or more graphics cards, a display interface (e.g., wired or wireless), etc.

As explained, a system may utilize one or more machine learning (ML) models. As to some examples of types of machine learning models, consider one or more of a support vector machine (SVM) model, a k-nearest neighbors (KNN) model, an ensemble classifier model, a neural network (NN) model, etc. As an example, a machine learning model can be a deep learning model (e.g., deep Boltzmann machine, deep belief network, convolutional neural network, stacked auto-encoder, etc.), an ensemble model (e.g., random forest, gradient boosting machine, bootstrapped aggregation, AdaBoost, stacked generalization, gradient boosted regression tree, etc.), a neural network model (e.g., radial basis function network, perceptron, back-propagation, Hopfield network, etc.), a regularization model (e.g., ridge regression, least absolute shrinkage and selection operator, elastic net, least angle regression), a rule system model (e.g., cubist, one rule, zero rule, repeated incremental pruning to produce error reduction), a regression model (e.g., linear regression, ordinary least squares regression, stepwise regression, multivariate adaptive regression splines, locally estimated scatterplot smoothing, logistic regression, etc.), a Bayesian model (e.g., naïve Bayes, average on-dependence estimators, Bayesian belief network, Gaussian naïve Bayes, multinomial naïve Bayes, Bayesian network), a decision tree model (e.g., classification and regression tree, iterative dichotomiser 3, C4.5, C5.0, chi-squared automatic interaction detection, decision stump, conditional decision tree, M5), a dimensionality reduction model (e.g., principal component analysis, partial least squares regression, Sammon mapping, multidimensional scaling, projection pursuit, principal component regression, partial least squares discriminant analysis, mixture discriminant analysis, quadratic discriminant analysis, regularized discriminant analysis, flexible discriminant analysis, linear discriminant analysis, etc.), an instance model (e.g., k-nearest neighbor, learning vector quantization, self-organizing map, locally weighted learning, etc.), a clustering model (e.g., k-means, k-medians, expectation maximization, hierarchical clustering, etc.), etc.

As an example, a machine model may be built using a computational framework with a library, a toolbox, etc., such as, for example, those of the MATLAB framework (MathWorks, Inc., Natick, Massachusetts). The MATLAB framework includes a toolbox that provides supervised and unsupervised machine learning algorithms, including support vector machines (SVMs), boosted and bagged decision trees, k-nearest neighbor (KNN), k-means, k-medoids, hierarchical clustering, Gaussian mixture models, and hidden Markov models. Another MATLAB framework toolbox is the Deep Learning Toolbox (DLT), which provides a framework for designing and implementing deep neural networks with algorithms, pretrained models, and apps. The DLT provides convolutional neural networks (ConvNets, CNNs) and long short-term memory (LSTM) networks to perform classification and regression on image, time-series, and text data. The DLT includes features to build network architectures such as generative adversarial networks (GANs) and Siamese networks using custom training loops, shared weights, and automatic differentiation. The DLT provides for model exchange various other frameworks.

As an example, the TENSORFLOW framework (Google LLC, Mountain View, CA) may be implemented, which is an open source software library for dataflow programming that includes a symbolic math library, which can be implemented for machine learning applications that can include neural networks. As an example, the CAFFE framework may be implemented, which is a DL framework developed by Berkeley AI Research (BAIR) (University of California, Berkeley, California). As another example, consider the SCIKIT platform (e.g., scikit-learn), which utilizes the PYTHON programming language. As an example, a framework such as the APOLLO AI framework may be utilized (APOLLO.AI GmbH, Germany). As an example, a framework such as the PYTORCH framework may be utilized (Facebook AI Research Lab (FAIR), Facebook, Inc., Menlo Park, California).

As an example, a training method can include various actions that can operate on a dataset to train a ML model. As an example, a dataset can be split into training data and test data where test data can provide for evaluation. A method can include cross-validation of parameters and best parameters, which can be provided for model training.

The TENSORFLOW framework can run on multiple CPUs and GPUS (with optional CUDA (NVIDIA Corp., Santa Clara, California) and SYCL (The Khronos Group Inc., Beaverton, Oregon) extensions for general-purpose computing on graphics processing units (GPUs)). TENSORFLOW is available on 64-bit LINUX, MACOS (Apple Inc., Cupertino, California), WINDOWS (Microsoft Corp., Redmond, Washington), and mobile computing platforms including ANDROID (Google LLC, Mountain View, California) and IOS (Apple Inc.) operating system based platforms.

TENSORFLOW computations can be expressed as stateful dataflow graphs; noting that the name TENSORFLOW derives from the operations that such neural networks perform on multidimensional data arrays. Such arrays can be referred to as "tensors".

As an example, a device may utilize TENSORFLOW LITE (TFL) or another type of lightweight framework. TFL is a set of tools that enables on-device machine learning where models may run on mobile, embedded, and loT devices. TFL is optimized for on-device machine learning, by addressing latency (no round-trip to a server), privacy (no personal data leaves the device), connectivity (Internet connectivity is demanded), size (reduced model and binary size) and power consumption (e.g., efficient inference and a lack of network connections). Multiple platform support, covering ANDROID and iOS devices, embedded LINUX, and microcontrollers. Diverse language support, which includes JAVA, SWIFT, Objective-C, C++, and PYTHON. High performance, with hardware acceleration and model optimization. Machine learning tasks may include, for example, image classification, object detection, pose estimation, question answering, text classification, etc., on multiple platforms.

As an example, a method can include receiving input for a field site in a field that emits methane and that includes a plurality of field sites, where a minority class of the field sites emit a majority of the methane; using a trained machine learning model and the input for the field site, making a determination as to whether the field site fits the minority class; and optimizing hydrocarbon production and methane emissions for a field development plan based on the determination. In such an example, the input can characterize potential for methane leakage at the field site. For example, the input can include age information for one or more of a well and equipment. In such an example, as equipment ages, it may be more prone to methane leakage. As an example, input can include parameters and parameter values that characterize equipment, a wellbore, a reservoir, one or more types of production techniques, etc. For example, a well that is subject to gas lift as an artificial lift technique may be more likely to leak methane where the gas employed for gas lift includes methane. As explained, a field site may behave differently over time. For example, as production declines from a well at a field site, emissions at the field site may change. As explained, one or more techniques may aim to support production targets of a well or wells where such techniques may include artificial lift, enhanced oil recovery, and/or one or more other techniques.

As an example, a method can include using a trained machine learning model that is trained by supervised learning using a labeled dataset to predict, based on input for a field site, methane emissions for the field site. In such an example, the method can include making a prediction for the methane emissions for the field site, comparing the methane emissions to a statistical metric associated with the field, and, based at least in part on the comparing, making the determination as to whether the field site fits the minority class of the field sites. In such an example, a statistical metric may be a threshold, a metric of a distribution, etc. As to some examples of machine learning models, consider one or more of a neural network model, a gradient boosting model, a random forest model, a support vector machine model, and an ensemble model.

As an example, a method can include using a trained machine learning model that is trained by unsupervised learning for outlier detection to make a determination as to whether a field site is an outlier where, if the field site is an outlier, it may be deemed to fit a minority class of field sites. In such an example, anomaly detection (e.g., outlier detection) may be utilized. For example, consider use of one or more of a local outlier factor model, an isolation forest model, and a one-class support vector machine model. As explained, a Pareto principle may apply to a field with field sites where a minority of the field sites (e.g., a minority class) emits a majority of the methane from the field. In such an example, a field development planning method may focus on field sites that fit the minority class, whether they include new field sites, existing field sites, etc., such that emissions from the field may be reduced and/or otherwise optimized with respect to one or more production targets.

As an example, a method can include optimizing hydrocarbon production and methane emissions for a field development plan in a manner that includes computing a net present value for hydrocarbon production including hydrocarbon production from a field site and, where the determination indicates that the field site fits a minority class of field sites, discounting the net present value based on methane emissions for the field site.

As an example, a method can include, if a determination indicates that a field site fits a minority class of field sites, optimizing hydrocarbon production and methane emissions for a field development plan using input for the field site to generated adjusted input for the field site. In such an example, the method may further include, using a trained machine learning model and the adjusted input for the field site, making a determination as to whether the field site still fits the minority class of the field sites. Such an approach can be repeated until a field site has associated input (e.g., specifications) that make the field site no longer fit the minority class, which, as explained, can be a class of high methane emitters (e.g., a class that is associated with a majority of methane emissions from a field, whether the field exists, is a prospective field being planned, is a field that is consider for further development, etc.). As an example, if a determination indicates that a field site does not fit a minority class of field sites, a method can include optimizing hydrocarbon production and methane emissions for a field development plan in a manner that includes considering the field site as a candidate for inclusion in the field development plan. For example, a field site that fits the minority class may be excluded while a field site that does not fit the minority class may be included, though an optimization may ultimately decide that it is not to be included in an optimal field development plan for one or more reasons (e.g., low production, difficulty to drill, etc.). As explained, an optimization process may be utilized to generate an optimal field development plan or, for example, a number of optimal field development plans (e.g., per a Pareto assessment, etc.). As an example, a method can include selecting a field development plan generated via an optimization process for implementation, noting that during an implementation process, such a plan may be subject to further assessment and revisions, as may be appropriate due to changes in conditions, resources, etc.

As an example, a method can consider a field site that is a proposed new field site, and can include where, if a determination indicates that the field site fits a minority class of field sites, optimizing hydrocarbon production and methane emissions for a field development plan by excluding the proposed new field site from the field development plan. In such an example, responsive to excluding the proposed new field site from the field development plan, the method may include proposing another new field site as an infill field site. As an example, an infill field site may call for drilling of an infill well.

As an example, field sites of a field can include existing field sites and associated methane emissions data. In such an example, a trained machine learning model can be utilized that is trained using at least a portion of the methane emissions data and specifications for the existing field sites. In such an example, the at least a portion of the methane emissions data may be limited to fields sites that are in a minority class of the field sites or not in the minority class of the field sites. For example, a trained machine learning model may be a class-based model, which may include multiple classes or a single class. As an example, a single class model may use a minority class as a single class or may use a majority class as a single class. Such a single class model may be implemented to make a determination as to whether a field site is in the single class or not in the single class.

As an example, a method can include, based at least in part on a determination for a field site, ranking methane emissions for the field site with respect to other field sites. In such an example, the method can include optimizing hydrocarbon production and methane emissions for a field development plan in a manner that, based on ranking, includes prioritizing field sites for adjustments that reduce methane emissions.

As explained, a FDP can include or be operatively coupled to a field emissions system. For example, the FDPlan framework can be expanded to include or can be operatively coupled to a field emissions system (e.g., via cloud connectors, via APIs, etc.).

As an example, a system can include one or more processors; a memory accessible to at least one of the one or more processors: processor-executable instructions stored in the memory and executable to instruct the system to: receive input for a field site in a field that emits methane and that includes a plurality of field sites, where a minority class of the field sites emit a majority of the methane; make a determination as to whether the field site fits the minority class through use of a trained machine learning model and the input for the field site; and optimize hydrocarbon production and methane emissions for a field development plan based on the determination.

As an example, one or more non-transitory computer-readable storage media can include processor-executable instructions to instruct a computing system to: receive input for a field site in a field that emits methane and that includes a plurality of field sites, where a minority class of the field sites emit a majority of the methane; make a determination as to whether the field site fits the minority class through use of a trained machine learning model and the input for the field site; and optimize hydrocarbon production and methane emissions for a field development plan based on the determination.

As an example, a computer program product can include one or more computer-readable storage media that can include processor-executable instructions to instruct a computing system to perform one or more methods and/or one or more portions of a method.

Figure 11:
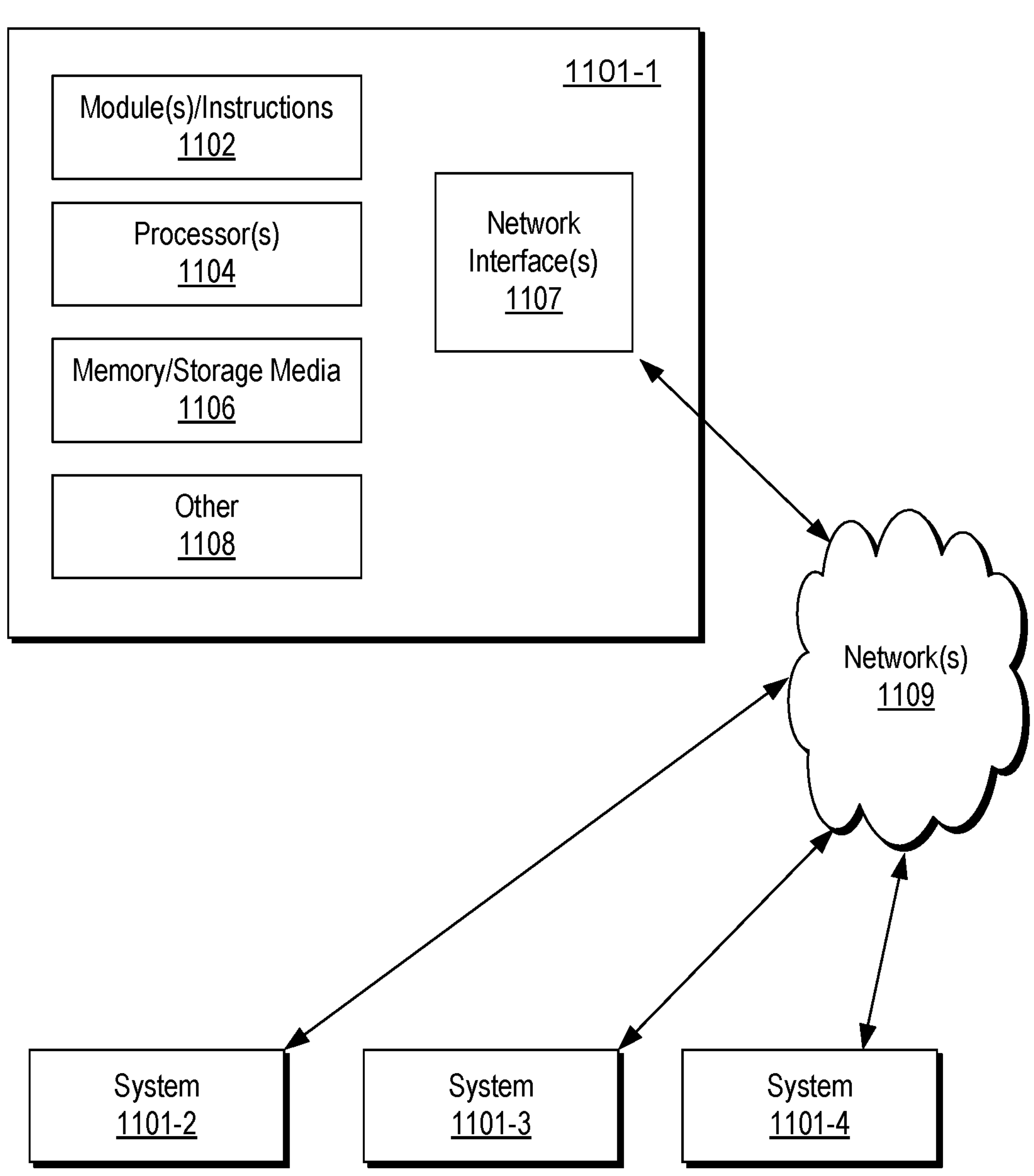
FIG. 11 illustrates examples of computer and network equipment.

In some embodiments, a method or methods may be executed by a computing system. FIG. 11 shows an example of a system 1100 that can include one or more computing systems 1101-1, 1101-2, 1101-3 and 1101-4, which may be operatively coupled via one or more networks 1109, which may include wired and/or wireless networks.

As an example, a system can include an individual computer system or an arrangement of distributed computer systems. In the example of FIG. 11, the computer system 1101-1 can include one or more modules 1102, which may be or include processor-executable instructions, for example, executable to perform various tasks (e.g., receiving information, requesting information, processing information, simulation, outputting information, etc.).

As an example, a module may be executed independently, or in coordination with, one or more processors 1104, which is (or are) operatively coupled to one or more storage media 1106 (e.g., via wire, wirelessly, etc.). As an example, one or more of the one or more processors 1104 can be operatively coupled to at least one of one or more network interfaces 1107; noting that one or more other components 1108 may also be included. In such an example, the computer system 1101-1 can transmit and/or receive information, for example, via the one or more networks 1109 (e.g., consider one or more of the Internet, a private network, a cellular network, a satellite network, etc.).

As an example, the computer system 1101-1 may receive from and/or transmit information to one or more other devices, which may be or include, for example, one or more of the computer systems 1101-2, etc. A device may be located in a physical location that differs from that of the computer system 1101-1. As an example, a location may be, for example, a processing facility location, a data center location (e.g., server farm, etc.), a rig location, a wellsite location, a downhole location, etc.

As an example, a processor may be or include a microprocessor, microcontroller, processor module or subsystem, programmable integrated circuit, programmable gate array, or another control or computing device.

As an example, the storage media 1106 may be implemented as one or more computer-readable or machine-readable storage media. As an example, storage may be distributed within and/or across multiple internal and/or external enclosures of a computing system and/or additional computing systems.

As an example, a storage medium or storage media may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLUERAY disks, or other types of optical storage, or other types of storage devices.

As an example, a storage medium or media may be located in a machine running machine-readable instructions, or located at a remote site from which machine-readable instructions may be downloaded over a network for execution.

As an example, various components of a system such as, for example, a computer system, may be implemented in hardware, software, or a combination of both hardware and software (e.g., including firmware), including one or more signal processing and/or application specific integrated circuits.

As an example, a system may include a processing apparatus that may be or include a general purpose processors or application specific chips (e.g., or chipsets), such as ASICs, FPGAs, PLDs, or other appropriate devices.

As an example, a device may be a mobile device that includes one or more network interfaces for communication of information. For example, a mobile device may include a wireless network interface (e.g., operable via IEEE 802.11, ETSI GSM, BLUETOOTH, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

As an example, a system may be a distributed environment, for example, a so-called "cloud" environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

As an example, information may be input from a display (e.g., consider a touchscreen), output to a display or both. As an example, information may be output to a projector, a laser device, a printer, etc. such that the information may be viewed. As an example, information may be output stereographically or holographically. As to a printer, consider a 2D or a 3D printer. As an example, a 3D printer may include one or more substances that can be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

Although only a few example embodiments have been described in detail above, those skilled in the art will readily appreciate that many modifications are possible in the example embodiments. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A method comprising:

receiving first input for a plurality of field sites in a field, wherein the field emits methane, wherein a minority class of the plurality of field sites emit a majority of the methane;

using an ensemble of trained machine learning models and the first input for the plurality of field sites, making a first determination as to whether a field site of the plurality of field sites fits the minority class, wherein the first input includes age information for at least one of a well or equipment and characterizes potential for methane leakage at the field site of the plurality of field sites with a data type;

identifying, using the first determination, a best-performing model of the ensemble of trained machine learning models for the data type of the first input;

selecting the best-performing model of the ensemble of trained machine learning models for making future predictions for inputs having the data type;

identifying an uncertainty of the determination by the best-performing model of the ensemble of trained machine learning models;

responsive to the uncertainty being greater than a threshold, installing an emissions-specific sensor at the field site of the plurality of field sites;

collecting emissions data at the field site of the plurality of field sites using the emissions-specific sensor;

re-training the best-performing model of the ensemble of trained machine learning models based on a second input of the data type, the second input including the emissions data, resulting in a re-trained ensemble of machine learning models;

using the best-performing model of the ensemble of re-trained machine learning models, the first input, and the second input, making a second determination as to whether the field site of the plurality of field sites fits the minority class; and optimizing, by a computing system comprising hardware, hydrocarbon production and methane emissions for a field development plan based on the second determination.

2. The method of claim 1, wherein the ensemble of trained machine learning models is trained by supervised learning using a labeled dataset to predict, based on the first input, methane emissions for the field site of the plurality of field sites.

3. The method of claim 2, comprising making a prediction for the methane emissions for the field site of the plurality of field sites, comparing the methane emissions to a statistical metric associated with the field, and, based at least in part on the comparing, making the determination as to whether the field site of the plurality of field sites fits the minority class.

4. The method of claim 2, wherein the ensemble of trained machine learning models comprises at least one of a neural network model, a gradient boosting model, a random forest model, a support vector machine model, or an ensemble model.

5. The method of claim 1, wherein the ensemble of trained machine learning models is trained by unsupervised learning for outlier detection to make the determination as to whether the field site of the plurality of field sites is an outlier and, thereby, fits the minority class.

6. The method of claim 5, wherein the ensemble of trained machine learning models comprises at least one of a local outlier factor model, an isolation forest model, or a one-class support vector machine model.

7. The method of claim 1, wherein optimizing hydrocarbon production and methane emissions for the field development plan comprises computing a net present value for hydrocarbon production including hydrocarbon production from the field site of the plurality of field sites and, wherein the determination indicates that the field site of the plurality of field sites fits the minority class, discounting the net present value based on methane emissions for the field site of the plurality of field sites.

8. The method of claim 1, wherein, if the determination indicates that the field site of the plurality of field sites fits the minority class, optimizing hydrocarbon production and methane emissions for the field development plan comprises adjusting the first input for the field site of the plurality of field sites to generated adjusted input for the field site of the plurality of field sites; and, wherein, if the determination indicates that the field site of the plurality of field sites does not fit the minority class, optimizing hydrocarbon production and methane emissions for the field development plan comprises considering the field site of the plurality of field sites as a candidate for inclusion in the field development plan.

9. The method of claim 8, further comprising, using the best-performing model of the ensemble of trained machine learning models and the adjusted input for the field site of the plurality of field sites, making a determination as to whether the field site of the plurality of field sites still fits the minority class.

10. The method of claim 1, wherein, the field site of the plurality of field sites is a proposed new field site, and wherein, if the determination indicates that the field site of the plurality of field sites fits the minority class, optimizing hydrocarbon production and methane emissions for the field development plan comprises excluding the proposed new field site from the field development plan.

11. The method of claim 10, responsive to excluding the proposed new field site from the field development plan, further comprising proposing another new field site as an infill field site.

12. The method of claim 1, wherein the plurality of field sites comprise existing field sites and associated methane emissions data.

13. The method of claim 12, wherein the ensemble of trained machine learning models is trained using at least a portion of the methane emissions data and specifications for the existing field sites.

14. The method of claim 13, wherein the at least a portion of the methane emissions data is limited to field sites that are in the minority class or not in the minority class.

15. The method of claim 1, further comprising, based at least in part on the determination, ranking methane emissions for the field site of the plurality of field sites with respect to other field sites of the plurality of field sites.

16. The method of claim 15, wherein optimizing hydrocarbon production and methane emissions for the field development plan comprises, based on ranking, prioritizing field sites of the plurality of field sites for adjustments that reduce methane emissions.

17. A system comprising:

one or more processors;

a hardware memory accessible to at least one of the one or more processors; and processor-executable instructions stored in the hardware memory and executable to instruct the system to:

receive first input for a plurality of field sites in a field, wherein the field emits methane, wherein a minority class of the plurality of field sites emit a majority of the methane;

using an ensemble of trained machine learning models and the first input for the plurality of field sites, make a first determination as to whether a field site of the plurality of field sites fits the minority class, wherein the input includes age information for at least one of a well or equipment and characterizes potential for methane leakage at the field site with a data type;

identify, using the first determination, a best-performing model of the ensemble of trained machine learning models for the data type of the first input;

select the best-performing model of the ensemble of trained machine learning models for making future predictions for inputs having the data type;

identify an uncertainty of the determination by the best-performing model of the ensemble of trained machine learning models;

receive emissions data that has been collected at the field site of the plurality of field sites using an emissions-specific sensor, the emissions-specific sensor having been installed at the field site of the plurality of field sites in response to the uncertainty being greater than a threshold;

re-train the best-performing model of the ensemble of trained machine learning models based on a second input of the data type, the second input including the emissions data, resulting in a re-trained ensemble of machine learning models;

using the best-performing model of the ensemble of re-trained machine learning models, the first input, and the second input, make a second determination as to whether the field site of the plurality of field sites fits the minority class; and optimize hydrocarbon production and methane emissions for a field development plan based on the second determination.

18. One or more non-transitory computer-readable storage media storing processor-executable instructions thereon which, upon execution by a computing system, cause the computing system to perform steps comprising:

receive first input for a plurality of field sites in a field, wherein the field emits methane, wherein a minority class of the plurality of field sites emit a majority of the methane;

using an ensemble of trained machine learning models and the first input for the plurality of field sites, make a first determination as to whether a field site of the plurality of field sites fits the minority class, wherein the first input includes age information for at least one of a well or equipment and characterizes potential for methane leakage at the field site with a data type;

identify, using the first determination, a best-performing model of the ensemble of trained machine learning models for the data type of the first input;

select the best-performing model of the ensemble of trained machine learning models for making future predictions for inputs having the data type:

identify an uncertainty of the determination by the best-performing model of the ensemble of trained machine learning models;

receive emissions data that has been collected at the field site of the plurality of field sites using an emissions-specific sensor, the emissions-specific sensor having been installed at the field site of the plurality of field sites in response to the uncertainty being greater than a threshold;

re-train the best-performing model of the ensemble of trained machine learning models based on a second input of the data type, the second input including the emissions data, resulting in a re-trained ensemble of machine learning models;

using the best-performing model of the ensemble of re-trained machine learning models, the first input, and the second input, make a second determination as to whether the field site of the plurality of field sites fits the minority class; and optimize hydrocarbon production and methane emissions for a field development plan based on the second determination.

* * * * *